United States Patent [19]
Vandivier, III

[11] Patent Number: 5,978,771
[45] Date of Patent: Nov. 2, 1999

[54] METHOD FOR TRACKING NATURAL RESOURCES IN A RESOURCE ALLOCATION SYSTEM

[76] Inventor: John Carl Vandivier, III, 65 E. Cedar, Suite C, Zionsville, Ind. 46077

[21] Appl. No.: 08/907,538

[22] Filed: Aug. 8, 1997

Related U.S. Application Data

[60] Provisional application No. 60/023,715, Aug. 8, 1996.

[51] Int. Cl.$^6$ ................................................ G06F 17/60
[52] U.S. Cl. ........................................ 705/8; 364/468.05
[58] Field of Search .......................... 705/8, 28, 6, 412

[56] References Cited

U.S. PATENT DOCUMENTS

| | | | |
|---|---|---|---|
| 4,744,026 | 5/1988 | Vanderbei | 705/8 |
| 4,744,028 | 5/1988 | Karmarkar | 705/8 |
| 4,797,839 | 1/1989 | Powell | 364/400 |
| 4,885,686 | 12/1989 | Vanderbei | 364/468.05 |
| 4,924,386 | 5/1990 | Freedman et al. | 705/8 |
| 5,033,004 | 7/1991 | Vandivier, III | 364/468 |
| 5,195,041 | 3/1993 | George et al. | 705/8 |
| 5,311,437 | 5/1994 | Leal et al. | 705/8 |
| 5,311,438 | 5/1994 | Sellers et al. | 705/8 |
| 5,541,394 | 7/1996 | Kouchi et al. | 705/8 |
| 5,541,848 | 7/1996 | McCormack et al. | 705/8 |
| 5,630,070 | 5/1997 | Dietrich et al. | 705/8 |
| 5,742,931 | 4/1998 | Spiegelhoff et al. | 705/8 |

*Primary Examiner*—Allen R. MacDonald
*Assistant Examiner*—Susanna Meinecke-Díaz
*Attorney, Agent, or Firm*—Woodard, Emhardt, Naughton Moriarty & McNett

[57] ABSTRACT

The tracking of an entire resource allocation chain, designed for better and more automatic tracking of the data associated with the transfer and positioning of such resources, enabling the combination of independent and integrated data collection and organization associated with the transfer, processing, quality evaluation and storage of such resources, as well as a new set of base allocation operations and database structures designed to enable and accommodate any type of resource allocation that might take place by an organization of such operations into a composite.

3 Claims, 20 Drawing Sheets

FROM FIG. 2A

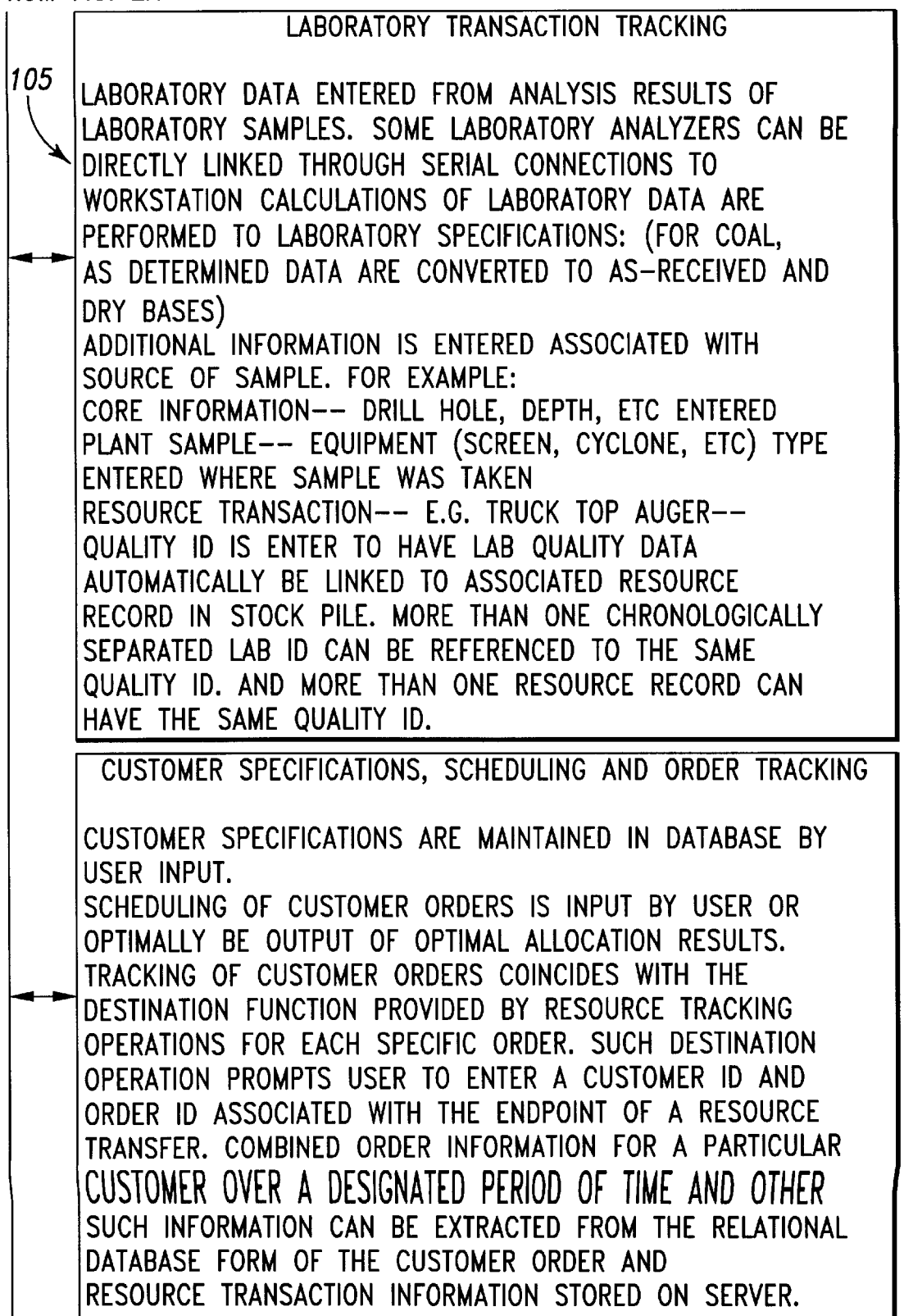

105

LABORATORY TRANSACTION TRACKING

LABORATORY DATA ENTERED FROM ANALYSIS RESULTS OF LABORATORY SAMPLES. SOME LABORATORY ANALYZERS CAN BE DIRECTLY LINKED THROUGH SERIAL CONNECTIONS TO WORKSTATION CALCULATIONS OF LABORATORY DATA ARE PERFORMED TO LABORATORY SPECIFICATIONS: (FOR COAL, AS DETERMINED DATA ARE CONVERTED TO AS-RECEIVED AND DRY BASES)
ADDITIONAL INFORMATION IS ENTERED ASSOCIATED WITH SOURCE OF SAMPLE. FOR EXAMPLE:
CORE INFORMATION-- DRILL HOLE, DEPTH, ETC ENTERED
PLANT SAMPLE-- EQUIPMENT (SCREEN, CYCLONE, ETC) TYPE ENTERED WHERE SAMPLE WAS TAKEN
RESOURCE TRANSACTION-- E.G. TRUCK TOP AUGER--
QUALITY ID IS ENTER TO HAVE LAB QUALITY DATA AUTOMATICALLY BE LINKED TO ASSOCIATED RESOURCE RECORD IN STOCK PILE. MORE THAN ONE CHRONOLOGICALLY SEPARATED LAB ID CAN BE REFERENCED TO THE SAME QUALITY ID. AND MORE THAN ONE RESOURCE RECORD CAN HAVE THE SAME QUALITY ID.

CUSTOMER SPECIFICATIONS, SCHEDULING AND ORDER TRACKING

CUSTOMER SPECIFICATIONS ARE MAINTAINED IN DATABASE BY USER INPUT.
SCHEDULING OF CUSTOMER ORDERS IS INPUT BY USER OR OPTIMALLY BE OUTPUT OF OPTIMAL ALLOCATION RESULTS.
TRACKING OF CUSTOMER ORDERS COINCIDES WITH THE DESTINATION FUNCTION PROVIDED BY RESOURCE TRACKING OPERATIONS FOR EACH SPECIFIC ORDER. SUCH DESTINATION OPERATION PROMPTS USER TO ENTER A CUSTOMER ID AND ORDER ID ASSOCIATED WITH THE ENDPOINT OF A RESOURCE TRANSFER. COMBINED ORDER INFORMATION FOR A PARTICULAR CUSTOMER OVER A DESIGNATED PERIOD OF TIME AND OTHER SUCH INFORMATION CAN BE EXTRACTED FROM THE RELATIONAL DATABASE FORM OF THE CUSTOMER ORDER AND RESOURCE TRANSACTION INFORMATION STORED ON SERVER.

↕ FROM FIG. 2B  ╱―107

Fig. 2C

OPTIMAL ALLOCATION OF RESOURCES

- OPTIMAL ALLOCATION FUNCTIONS ARE EMBODIMENT OF THOSE FUNCTIONS SPECIFIED IN THE DESCRIPTION OF U.S. PATENT 5,033,004.
- ADDITIONAL DATABASE LINKS FROM WORKSTATION TO SERVER ALLOW MULTIPLE USERS TO UPDATE DATABASES USED TO DETERMINE OPTIMAL ALLOCATIONS,
- WEIGHTED AVERAGES IF RESOURCE RECORDS OVER LOCATION, LEVEL, STOCKPILE, SUBSETS OF STOCKPILES, SUPERSETS OF STOCKPILES, RANGES OF COORDINATES OF RESOURCE RECORDS SUCH AS GPS COORDINATES AND OTHER SUCH COMBINATIONS OF ADDRESSABLE CRITERIA STORED IN SERVER DATABASE CAN BE DETERMINED FOR ANY STAGE OR COMBINATION OF STAGES DEFINED BY A COMPOSITE OF RESOURCE TRANSACTION OPERATIONS, SUCH WEIGHTED AVERAGES ALLOW USER TO COLLECT WEIGHTED AVERAGE COSTS, QUANTITIES, QUALITIES, AND OTHER SUCH ALLOCATION INFORMATION FOR EACH LOGISTICAL LEG OF THE ALLOCATION PATHWAY AS INPUT INTO THE DATABASES USED FOR DETERMINING OPTIMAL ALLOCATIONS FROM THE TRANSACTION DATABASES RESIDING ON SERVER,
- CUSTOMER ORDERS, QUALITY SPECIFICATIONS, QUALITY PREMIUMS AND PENALTIES, CUSTOMER REVENUE, CUSTOMER ORDER SCHEDULING, SHIPMENT LOAD OUT SITE, CARRIER TYPE SUCH AS BARGE, RAIL, TRUCK OR VESSEL INFORMATION ENTERED IN SEVER DATABASE CAN BE LINKED TO DATABASES USED FOR OPTIMAL ALLOCATION.
- STATISTICAL AVERAGES OF DATA RESIDING ON SERVER DATABASE TO DETERMINE SUCH ESTIMATES AS TYPICAL YIELD OF PAST PROCESSING OF RESOURCES OR OTHER SUCH ESTIMATES CAN BE MADE FROM SERVER DATABASES AND LINKED TO DATABASES USED FOR OPTIMAL ALLOCATION OF QUARTERLY OR ANNUAL ALLOCATION PROJECTIONS.
- BY WAY OF ASSEMBLING ALL DATA TRANSACTIONS FROM ALL SOURCES AT ALL ALLOCATION STAGES AND STORING SUCH DATA ON A COMMON SERVER DATABASE, ALL SUCH DATA CAN BE READILY ASSEMBLED BY EASILY DEFINED SEARCH QUERIES AND DIRECTLY LINKED TO THE DATABASES USED FOR OPTIMAL ALLOCATION OF SHORT RUN OR LONG RUN ALLOCATION OBJECTIVES. THIS REDUCES USER INPUT, PROMOTES MORE ACCURATE AND RELIABLE ESTIMATES, AND PROVIDES A WIDER RANGE OF EASILY ACCESSABLE DATA TO BE USED TO PROMOTE IMPROVED QUALITY AND RESOURCE REALIZATION THROUGH THE OPTIMAL ALLOCATION OF SUCH RESOURCES.

Fig. 2H (CONSOLIDATION OPERATION) 401 400

MULTIWINDOW SELECTION SCREEN

BOTTOM WINDOW: DISPLAY RECORDS OF RESOURCE TYPES AND TONS SELECTED FOR CURRENT CONSOLIDATION
MIDDLE WINDOW: DISPLAY RECORDS OF RESOURCE TYPES AND TONS SELECTED FROM CURRENT ALLOCATION BUFFER
TOP WINDOW: DISPLAY TABBED PAGES ALLOWING SELECTION OF ADDITIONAL INFORMATION ASSOCIATED WITH THE RESOURCE TYPE RECORDS IN THE PREVIOUS WINDOWS SUCH AS:

1) SEE 304 FIG. 2F
2) WEIGHTED AVERAGED VALUES OF CURRENT RECORDS SELECTED FOR CONSOLIDATION
   A) TOTAL TONS SELECTED FOR CONSOLIDATION
   B) WEIGHTED AVERAGE QUALITY SELECTED

402

(CONSOLIDATION OPERATION) 403 405  404

UPDATE: SELECTION IDENTITY BUFFER AND CONSOLIDATION IDENTITY BUFFER FROM CONSOLIDATION OPERATION SELECTIONS

MOVE FROM RECORDS IN SELECTION BUFFER TO RECORDS IN CONSOLIDATION BUFFER
*INCLUDE ALL LOCATION ID'S AND PREVIOUS TRANSACTION ID'S
USER SELECTS WITH MOUSE CLICK EACH RECORD AND TONS THAT IS TO BE CONSOLIDATED FROM THE RECORDS IN THE SELECTION BUFFER. ALL SELECTED RECORDS ARE TRANSFERRED TO THE CONSOLIDATION BUFFER

REMOVE FROM SELECTED RECORDS IN CONSOLIDATION BUFFER BACK TO RECORDS SELECTED IN SELECTION BUFFER
*USE PREVIOUS TRANSACTION ID AND LOCATION ID INFORMATION TO PROPERLY TRANSFER SELECTED RECORDS BACK TO THE SELECTION BUFFER 406
408

SAVE CONSOLIDATION
USER CLICKS MOUSE TO SELECT TO SAVE CONSOLIDATION CHOICE

FORM NEW CONSOLIDATION ID FROM
USER LOCATION, CURRENT DATA/TIME AND OFFSET NUMBER FOR CONFLICTS AND USING THE NUMBER OF CONSOLIDATIONS USER HAS GENERATED FROM HIS LOCATION FOR DATE (C) 407 (B)
TO FIG. 2J    TO FIG. 2I

FROM FIG. 2H

UPDATE SELECTION IDENTITY BUFFER WITH NEW CONSOLIDATION IDENTITY RECORD. UPDATE CONSOLIDATION TEMPORARY DATABASE WITH NEW CONSOLIDATION RECORD. UPDATE CONSOLIDATION CONSTITUTION TEMPORARY DATABASE WITH CONSOLIDATION CONSTITUENT RECORDS. DETERMINE WEIGHTED AVERAGE QUALIFIES, YIELDS, AND COSTS FOR EACH PARTITION DEFINED FOR THIS LOCATION/LEVEL FROM THE CONSTITUENT PARTITIONS AND STORE AS NEW PARTITION INFORMATION FOR THIS NEW CONSOLIDATION RECORD   *410*

FROM FIG. 2H

EXIT WITHOUT SAVE
RELEASE ALL TEMPORARY DATABASE
BUFFERS ASSOCIATED WITH CONSOLIDATION

FROM FIG. 2K (E)

Fig. 2L

USER EDITS PERCENTAGE RATIOS DISPLAYED TO ACTUAL VALUES OR USERS DEFAULT VALUES PREVIOUSLY DISPLAYED OR ENTERS ACTUAL QUANTITIES OF EACH CONSTITUENT COMPONENT OF RESOURCE THAT OCCURRED IN THE PARTITIONING OF THE BULK RESOURCE TO WHICH THE RESOURCE RECORD CORRESPONDS, RESULTING PARTITIONED RECORDS STORED IN TEMPORARY PARTITION CONSTITUTION BUFFER
— 509

QUALITY ID'S CORRESPONDING TO QUALITY VALUES FOR EACH PARTITIONED COMPONENT REFER TO PRE-DEFINED DEFAULT QUALITIES FOR RECORDS.
PARTITION USER CAN SELECT THESE BY MOUSE CLICK OR SELECT LINE OR LEAST SQUARES ESTIMATES BETWEEN THE PRE-PARTITIONED RECORD AND THE PARTITIONED QUALITY VALUES OR THE USER CAN CLICK MOUSE TO OVERRIDE SUCH ESTIMATES BY ENTERING QUALITY ESTIMATE VALUES, LEAST SQUARE ESTIMATES DERIVE FROM PREVIOUS RELATIONSHIPS BETWEEN PAST SIMILARLY PARTITIONED RESOURCE RECORDS STORED IN DATABASE LOCALLY OR ON SERVER
— 510

511    512
<SAVE PARTITION> —NO→ EXIT WITHOUT SAVE RELEASE ALL TEMPORARY DATABASE BUFFERS ASSOCIATED WITH PARTITION
→ TO 212 FIG. 2D

YES

FORM NEW PARTITION ID'S FROM USER LOCATION, CURRENT DATE/TIME AND OFFSET MEMBERS FOR CONFLICTS AND USING THE NUMBER OF PARTITIONS USER HAS GENERATED FROM HIS LOCATION FOR DATE
— 513

UPDATE SELECTION IDENTIFY BUFFER WITH NEW PARTITION RECORDS: FORM NEW PARTITION RECORDS DETERMINED FROM EACH OF THE PARTITION SETS THAT ARE TO BE ASSOCIATED WITH EACH NEW PARTITION RECORD AS DEFINED FROM ORIGINAL PARTITION SET ASSOCIATED WITH ABOVE PARTITION.
THIS PREPARES EACH PARTITIONED RECORD TO BE PARTITIONED AGAIN IF USER ELECTED TO DO SO IN A LATTER STAGE.

→ TO 212 FIG. 2D     — 514

FROM FIG. 2N (F)

/-700

| MICROPROCESSOR TRANSFERS RECORD TO TEMPORARY DESTINATION BUFFER DISPLAYED IN BOTTOM WINDOW. |
| --- |

MICROPROCESSOR TRANSFERS RECORD TO TEMPORARY DESTINATION
BUFFER DISPLAYED IN BOTTOM WINDOW.
IF MULTIPLE DESTINATIONS ARE REQUIRED, THEN THE RESOURCE
RECORD IS TRANSFERRED AS MANY TIMES AS REQUIRED.
THE RESOURCE RECORD IS DELETED FROM TEMPORARY IDENTITY
ALLOCATION BUFFER AND USER IS PROMPTED TO EDIT THE QUANTITY
TRANSFERRED TO EACH DESTINATION WHICH USER IS ALSO PROMPTED
TO DESIGNATE.
FOR EACH RECORD TRANSFERRED, A UNIQUE ID IS FORMED FOR EACH
RECORD FROM USER LOCATION, CURRENT DATE/TIME, THE NUMBER OF
DESTINATION RECORDS ISSUED FROM USER LOCATION ON CURRENT
DATE AND AN OFFSET NUMBER TO RESOLVE CONFLICTS OF UNIQUENESS.
THE ORIGINAL RESOURCE RECORD AND ALL DESTINATION RECORDS ARE
SAVED IN TEMPORARY DESTINATION SOURCE AND TERMINUS
CONSTITUTION BUFFERS.

~706

USER SELECTS FROM LIST OF SCHEDULED CUSTOMER
ORDER/DESTINATION LOCATION COMBINATIONS.
IF DESTINATION IS BARGE, RAIL, VESSEL OR TRUCK LOAD OUT, USER IS
PROMPTED FOR ADDITIONAL INFORMATION SUCH AS BARGE DRAFTING
INFORMATION FOR DETERMINING TONS RECEIVED AT DESTINATION BARGE.
BOTH QUANTITY AND QUALITY ID'S SHIPPED AND QUANTITY AND QUALITY
ID'S RECEIVED AS INPUT BY USER.
BOTH SHIPPED AND RECEIVED VALUES ARE STORED IN DATABASE BY
MICROPROCESSOR.
USER DESIGNATES THE DESTINATION FOR EACH RESOURCE RECORD IN
THE TEMPORARY DESTINATION BUFFER BY USING MOUSE TO SELECT
FROM A POP UP LIST OF ALTERNATIVE CHOICES PROVIDED BY SUCH
DESTINATION LOOK UP TABLE.
USER ALSO EDITS QUANTITY TO BE RECEIVED AT EACH DESTINATION,
TEMPORARY DESTINATION SOURCE AND TERMINUS CONSTITUTION BUFFERS
ARE ALSO PROVIDED WITH THESE DESTINATION CHOICES BY
MICROPROCESSOR.

*900* ( RADIO FREQUENCY ENABLED TRANSACTION TRACKING )—*901*

LOADER OPERATOR INITIALIZES ON BOARD COMPUTER WITH ALLOCATION INFORMATION OF RESOURCES TO BE LOADED ONTO CARRIERS SUCH AS TRUCKS, BARGES, ETC. SETS RF POLLING ON.

—*902*

RESOURCE CARRIER WITH ON BOARD RADIO FREQUENCY TAG TRANSMITTER/RECEIVER ARRIVES AT LOADER, FOR RESOURCE LOADING

—*903*

COMPUTER ON BOARD LOADER, SET TO TRANSMIT A BACK WASH RADIO FREQUENCY SIGNAL TO SEARCH FOR AND IDENTIFY ANY RADIO FREQUENCY TAGS WITHIN ITS PROXIMITY (75 FEET), IDENTIFIES ONE OR MORE SUCH RF TAGS.

—*904*

A LIST OF IDENTIFIED TAGS AND ASSOCIATED INFORMATION ASSOCIATED WITH SUCH TAGS IS RECEIVED FROM IDENTIFIED TAGS BY AUTOMATIC RF POLLING OF SUCH TAGS BY COMPUTER ON BOARD LOADER

—*905*

SUCH LIST OF IDENTIFIED TAGS IS AUTOMATICALLY DISPLAYED TO LOADER DRIVER OR OTHER SUCH RESOURCE DISPATCHER. RESOURCE INFORMATION IN LOADER COMPUTER MEMORY IS SENT BY SERIAL LINK TO RADIO FREQUENCY TRANSMITTER AND RECEIVED ON TAG OF CARRIER SELECTED BY LOADER DISPATCHER TO RECEIVE SUCH RF DATA.
LOADER-DISPATCHER CAN SELECT TO HAVE RESOURCE DATA AUTOMATICALLY TRANSFERRED TO CARRIER WITHOUT LOADER DISPATCHER INTERVENTION, OR LOAD-DISPATCHER CAN MOVE CURSOR TO SELECT CARRIER-TAG TO RECEIVE RF RESOURCE INFORMATION, OR IN CASE OF MULTIPLE CARRIER-TAGS WAITING TO RECEIVE RF RESOURCE DATA, LOADER-DISPATCHER CAN SELECT FROM ALTERNATIVE CARRIER-TAGS DISPLAYED WHICH SHOULD RECEIVE SUCH RESOURCE DATA.
RESOURCE DATA MIGHT CONSIST OF SOURCE LOCATION OF RESOURCE, DESTINATION OF RESOURCE, OWNER OF RESOURCE, ETC.

—*906*

RADIO FREQUENCY RECEIVING OF RESOURCE DATA PREVIOUSLY SENT TO CARRIER-TAG IS AUTOMATICALLY MADE TO COMPOSE DATA RECEIVED TO DATA TRANSMITTED. ANY DISCREPANCIES ARE BROUGHT TO THE ATTENTION OF LOADER-DISPATCHER BY A MESSAGE DISPLAYED TO HIS COMPUTER SCREEN.

METHOD FOR TRACKING NATURAL RESOURCES IN A RESOURCE ALLOCATION SYSTEM

This application claims benefit of Provisional Application 60/023,715 filed Aug. 8, 1996.

BACKGROUND OF THE INVENTION

1. Field of the Invention

The field of this invention is the mining industry, particularly the bulk transfer, processing, blending, and storage of natural resources.

2. Brief Description of the Prior Art

The field of application concerns many mining resources, but without loss of generality and to promote the understanding of the invention through a specific example, the coal mining industry shall be considered.

From the implementation of the development of a broad means of optimizing the allocation of coal and other natural resources as disclosed in U.S. Pat. No. 5,033,004 by the present inventor, a number of important needs and difficulties have been identified.

U.S. Pat. No. 5,033,004 provided for a method of optimizing the allocation of multiple coal types with multiple qualities, processing through multiple possible processing paths, delivery of such blended combinations of processed and nonprocessed coal batches to a multiplicity of orders each with unique quality specifications and premiums or penalties that such delivered batches must meet. And since such allocation choices should reflect these allocation needs designated for a multiplicity of time periods such as days, weeks, months, or years, U.S. Pat. No. 5,033,004 provided a method of also achieving such allocation needs over multiple time periods.

Over the first few years of introducing this new technology, a number of problems have been identified. A number of these concerns the broad category of input and the deficiencies of the allocation infrastructure in the manual handling of data, tracking of resource allocation, processing, and associated qualities as well as the organization of the elements of allocation through a more comprehensive database structure.

The typical allocation begins in a pit of a strip mine or at the mouth of a deep mine. There, a loader shovels coal into a truck which begins the source coal's transfer. Typically, a radio voice message is given by a loader operator to a truck operator who is suppose to remember what coal type he is carrying and from where it came. Many times this basic information is not remembered in the transfer process. Moreover, other pertinent information, that could be bound with the coal being transferred is not associated with the transferred coal because of time and accuracy restrictions on the part of the coal loader and truck operators. For example, specific information associated with the loaded source coal may have inaccuracies introduced or may be lost such as the source mine, the source pit, the source sector of the pit, the source property owner of the pit, the date and time the source coal was moved, the estimates of the quality and beneficiation response of the source coal and other particular information of loaded source coal—such as there is excess rock debris that was loaded in this truck.

Next, the truck and coal combination is typically weighed on scales. This is typically the first stage where information is picked up and stored in a computer. Autoscale, located in Charleston, W. Va. has made advances in collecting scale data onto a Personal Computer directly from the scale weights. Further, the truck operator, usually has a magnetically readable card with his truck information encoded on the card. By swiping the card in a card reader at the scale site, the trucking company and truck number can be directly read into a personal computer in the scale house. The date and time of the weighing are read from the personal computer, and the scale weight is read from the scale into the personal computer. Usually there is a keyboard with the card reader at the scale where the truck driver can input a predetermined code designating the source of his load. At the end of a shift or day, a number of trucks and their associated tons are totaled by source. Hence, the number of tons of each delivered source coal are determined from the input information provided the information is accurately input.

Typically, coal samples are taken from some of the source coal delivery trucks associated with each source coal. Such samples are used to provide an estimate of the quality associated with all of the trucked coal over a designated period of time—such as a day.

The coal samples are evaluated by a coal lab which relays the results by radio, fax, or input to a computer spreadsheet or database of laboratory results.

After weighing the coal and from time to time sampling the coal, the coal is routed, usually by a loader driver, to unload the coal either in a stock pile or directly into a bin which may be feeding a coal wash plant, or shipment such as into a barge, rail, or vessel. Typically, the exact location of the unloaded truck is not recorded, except a gross note by the loader operator that a number of trucks deposited tons in a stock pile and others were directed to a bin. But, typically, this exact information is not recorded since the loader operator does not have time.

If, the source of the coal is a stock pile rather than a pit, the exact tons or shovel count of removed coal from where exactly in the stock pile is typically only approximated by the loader operator. Furthermore, since each transaction is time consuming to record in detail, the estimation of exact source, its quantity, and its associated quality estimate become more and more inaccurate.

Also, in the past, the most important pieces of information have been the total tons and quality delivered to a customer. At this stage more accurate sampling and weighing is performed (in many cases by automatic samplers) and coordinated by coal supplier, customer, and in many cases third party referees. The emphasis on this final stage of the allocation process has meant that the earlier stages could be relatively ignored or at least not as aggressively tracked. This was especially true since the cost to manually track this detailed allocation information was great or required additional time and since the benefit prior to the introduction of U.S. Pat. No. 5,033,004 was not sufficiently great to warrant the cost.

With the integration of better means of resource realization by means of optimization using methods embodied in U.S. Pat. No. 5,033,004 it is now even more important to keep track of what resources are available, where these resources are and what their quality is to an ever more exacting degree, since if this knowledge is present and readily available, the best allocation can be made possible for the optimum realization of these resources.

Furthermore, optimum resource realization can be achieved by processing a resource sufficient to meet the quality expectations of its end use. In the case of coal, it is washed based on expected float and sink information from lab samples evaluated from each specific coal that may be processed. Degrees of beneficiation in coal occur by controlling such processing variables as specific gravity and screening in the coal washing process. To determine how to best realize the value of coal from its various processing options as can be achieved through the methods embodied in U.S. Pat. No. 5,033,004, it is necessary to keep detailed track of the associated beneficiation parameters associated with each coal and again keep detailed track of each coal as it is transferred, evaluated and stored so that these associations are not lost or made ineffective by ever greater inaccuracies.

Other needs arose for the tons, and weighted average qualities and costs of stockpile groupings (either subsets or supersets of stockpiles) to be used as input to the embodiment of U.S. Pat. No. 5,033,004. Without the close tracking of the allocation elements that support this information, it many times cannot be readily or accurately made available.

Also, accounting for the allocation and processing of coal sources is usually developed around preset allocation paths. When a method such as that embodied in U.S. Pat. No. 5,033,004 suggests alternative allocation paths, there can be inertia on the part of managers to attempt these alternatives because of inflexibilities of their accounting and software infrastructure to accommodate these new alternatives.

A need therefore arose for an infrastructure change in the tracking of the entire resource allocation chain, for better and more automatic tracking of the data associated with the transfer and positioning of such resources, a combination of independent and integrated data collection and organization associated with the transfer, processing, and quality evaluation of such resources, as well as a new set of base allocation operations and database structures designed to enable and accommodate any type of resource allocation that might take place by an organization of such operations into a composite.

SUMMARY OF THE INVENTION

The present invention relates to the tracking of the entire resource allocation chain, a means for better and more automatic tracking of the data associated with the transfer and positioning of such resources, a means to enable the combination of independent and integrated data collection and organization associated with the transfer, processing, quality evaluation and storage of such resources, as well as a new set of base allocation operations and database structures designed to enable and accommodate any type of resource allocation that might take place by an organization of such operations into a composite.

Allocation is characterized as a sequence of allocation legs that together span the allocation from its origin to its final destination where the origin and/or destination may be multiple and may be either a physical location or represent a logical endpoint in the allocation sequence. Each allocation leg is characterized by a composition of base (elementary) allocation operations that together represent the allocation between the possibly multiple beginning and end points of the allocation legs.

The endpoints of the legs are identified by a logical positioning by a hierarchal level designation as well as a physical coordinate positioning either by means of a G.P.S. or an alternative more locally oriented coordinate positioning mechanism. Such positioning of the bulk material is stored along with other information associated with the bulk material and is used as a means to address its location. Thus the constituents of stockpiles can be better defined and a more accurate estimate of associated quality, tonnage, processing parameters, and costs can be estimated, queried, and combined together for input into databases to be used to determine the optimal allocation of bulk material as provided for in U.S. Pat. No. 5,033,004. An elementary operation is construed to mean a Selection, Partition, Consolidation, or Destination step in the allocation of bulk material.

By such a characteristic of Allocation into elementary operations over sufficiently small legs, a very complex allocation can be represented. Database storage of data associated with each leg and operation such as cost data, quality data, quantity information, recovery, sizing or other such changes resulting from processing, provides a means of capturing all of the relevant information associated with the allocation.

Input of allocation data is made more efficient by such means as using related databases of past data or least square estimates from such data to estimate output from partition and/or consolidation operations such as expected or estimated weighted qualities, recoveries, costs, and other changes resulting from processing. Macros, or predetermined groupings of elementary operations over one or more legs can act to expedite the data entry for common allocation paths, prompting the user to execute only those steps and enter only that data that cannot be estimated sufficiently.

A means for transfer of information associated with the bulk material carried by wireless means enables more accurate elementary data collection with the minimum of user intervention. Such means allow for the flexible tracking of bulk material transferred and/or processed over a variety of standard and nonstandard pathways. Such means also allow for the generalized organization of such data in relational databases designed to accommodate allocation broken down into component allocation legs and operations. This generalized storage structure can then be automatically queried and combined together for input into databases to be used to determine the optimal allocation of bulk material as provided for in U.S. Pat. No. 5,033,004, providing means of tracking nonstandard allocation paths suggested by output from such optimization.

The present invention employs radio frequency means to automatically identify a truck or other bulk hauling equipment. It also employs a radio frequency means to transfer information associated with such bulk resource transferred onto such bulk hauling equipment. By this means a loader operator may pre-program into a small computer attached to such radio transmitter/receiver the data associated with the resource to be transferred to each bulk carrier. When the carrier arrives, it is automatically identified and the preprogrammed data is transmitted to the bulk carried either by hands on or hands off execution by the loader operator. Additional information such as weights from a scale, quality sample number associated with a sample taken from the bulk material on the carrier can be transmitted to the carrier. At its destination, a loader operator or other route controller can transmit the carrier's final destination or the final destination can be determined and automatically recorded by the carrier. By such means as described by the present invention, accurate information can be maintained on and about the transfer of all bulk material from one location to another. And by such means this information can be transmitted from the carrier of the bulk material to a computer that can integrate this information with other such transfer information.

By an appropriate identification method, each loader can maintain independence and be dissociated from a common computer integrating such allocation transfers, but when the data is eventually retrieved to be integrated with other transfers, the integration is assured.

By a breakdown of each allocation leg or stage into its endpoints of origin and destination via a location-level-stockpile-subset-superset/coordinate definition (by GPS or local reference) and by a breakdown of the allocation operations into elementary operations (i.e. Selection, Partition, Consolidation, Destination), any composite operation can be generated representing most possible allocation/ processing eventualities. The quality and cost adjustments to the bulk transferred materials associated with these cumulative allocation legs can be maintained.

By an appropriate identification method, each transferred bulk material can have an associated quality ID that can be updated as the latest quality information associated with that bulk element becomes available.

By a means of an organized and integrated system of databases, each allocation element can be divided into its smallest components, yet integrated in such a way that these components can be assembled for in a multiplicity of arrangements depending on the objectives sought. And one such objective is that the data be readily brought together as input into the framework as described in the embodiment of U.S. Pat. No. 5,033,004 so that the optimal realization of resources can be achieved.

In one form of the invention, a method for tracking natural resources in a resource allocation system, comprising the steps of a) creating a base allocation record for each of a plurality of bulk material items, wherein each of the base allocation records contains descriptive data relating to the associated bulk material item, the descriptive data including at least a quantity, quality factor and location of the bulk material item; b) providing a desired natural resource specification specifying at least a desired quantity and a desired quality factor; c) selecting a plurality of base allocation records; d) consolidating the selected plurality of base allocation records into a consolidated allocation record meeting the desired natural resource specification; e) moving the bulk material items associated with the consolidated allocation record to a destination location; and f) recording the destination location in the consolidated allocation record.

BRIEF DESCRIPTION OF THE DRAWINGS

FIGS. 4A–B is a schematic block diagram of a radio frequency enable transaction tracking process of the present invention.

DESCRIPTION OF THE PREFERRED EMBODIMENT

Figure 1:
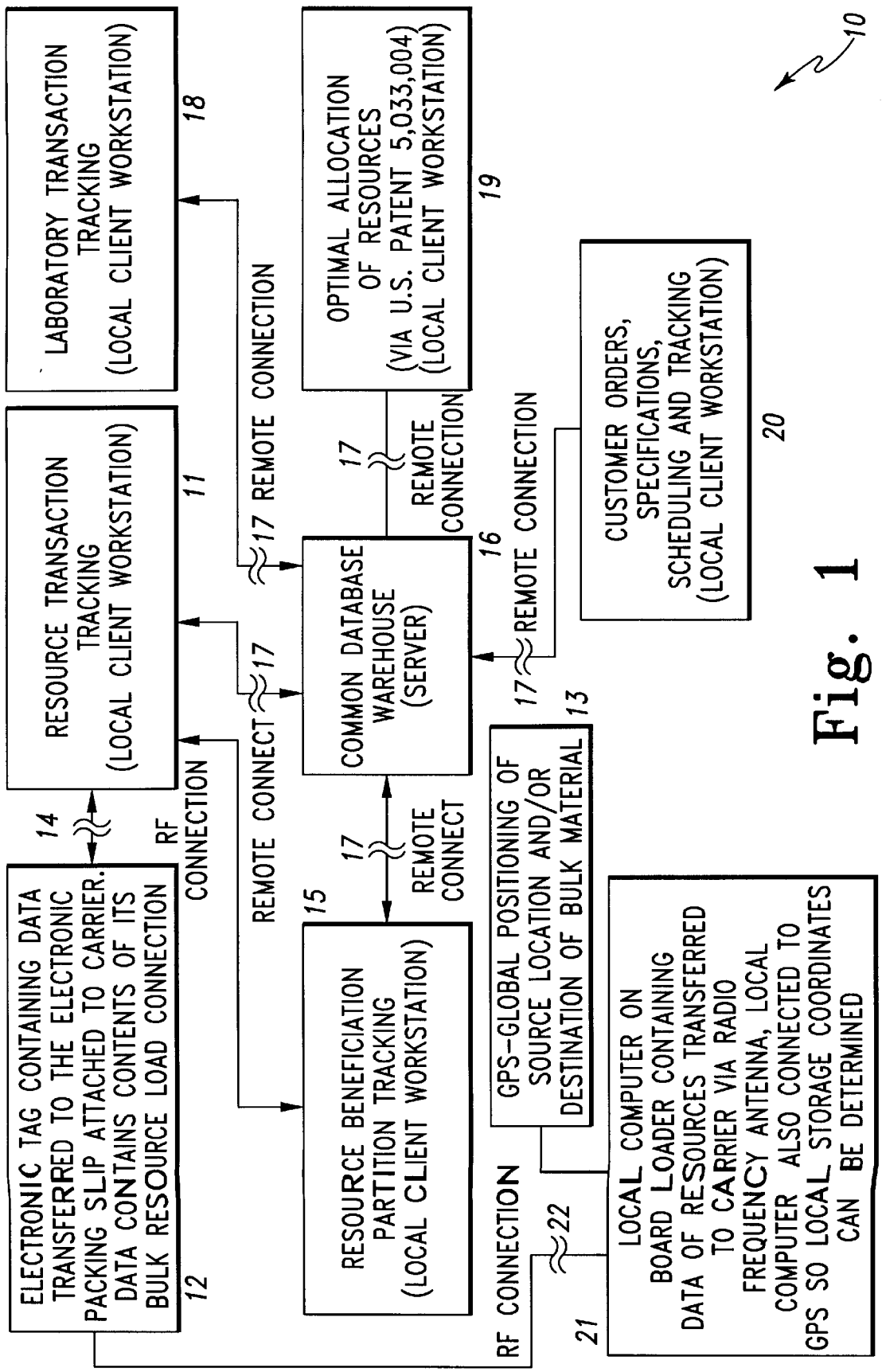
FIG. 1 is a schematic block diagram of a preferred embodiment wide-area network resource allocation system of the present invention.

For purposes of promoting an understanding of the principles of the inventions, reference will now be made to the embodiment illustrated in the drawings and specific language will be used to describe the same. It will nevertheless be understood that no limitation or loss of generality of the scope of the invention is thereby intended, such alterations and further modification in the illustrated embodiment, and such further applications of the principles of the invention as illustrated therein being contemplated as would normally occur to one skilled in the art to which the invention relates.

The preferred embodiment of the present invention is directed to the broad integration of the elements of the allocation process. Since the physical separation of the allocation chain may span large distances, it is the preferred embodiment to arrange the system into a wide area network or client-server system of computer, communication, and software. Alternative embodiments could include a mainframe as part of the system. In FIG. 1 the common database warehouse server 16 represents a computer taken to consist of random access memory, a microprocessor, a permanent memory such as a magnetic disc drive which is connected to computers of similar constitution 11, 15, 18, 19, and 20 in FIG. 1 which are designated as workstations. In FIG. 1 these workstations show each of the essential functions that the overall allocation system implements. However any function can be accessed from any workstation. Both server and workstations support compatible operation systems such as Microsoft Windows 95. The workstations can support local databases and the server can support databases that are common to all workstations. It is the preferred embodiment of the present invention that the local databases be formed within Microsoft's Visual FoxPro and the server database engine be Microsoft SQL Server that would support the common server databases. Remote connections 17 to server 16 may be either direct cable, modem connections, or other similar means.

There is also a need for complete separation between a workstation and server in the event that the workstation is part of a mobile site such as a front-end loader where it is costly or unnecessary to have a workstation 21 constantly connected to a server or when problems with links 17 such as modem connections would prohibit connection between workstation 21 and server 16. It is the preferred embodiment of the present invention that this separation is contemplated and that the data collection of the allocation progress independently of server 16 connections. To this end, unique identification numbers (hereinafter referred to as IDs) are generated for an allocation step from the Workstation Location Number of the user that is collecting the data associated with the allocation step. Other such information such as date, time, the number of such allocation steps for that date, and an offset number are used to define a unique ID number. The offset number is used when an ID number is integrated with the server database and a conflict of uniqueness arises. In this case the offset number can be adjusted to resolve uniqueness. With this mechanism in place for workstations collecting allocation data locally, data integration with the server 16 is assured.

It is the preferred embodiment of the present invention to break up all allocation into a combination of base operations between the elementary legs of the allocation process. With these two mechanisms in place, the allocation method embodiment allows the tracking of most any resource allocation. All resources move from one point or stage to the next. These stages are captured by a Location, Level, Stockpile and Sub-Stockpile category for each stage defined in the allocation chain. These serve as beginning points and endpoints of each basic allocation transfer that is itself defined as a composite of base allocation operations such as Selection 207, Consolidation 209, Partition 211 and Destination 213 (see FIG. 2D). Taken together in most any combination, the composite of these operations between two basic steps or stages as defined by the Location/Level/ StockPile/Sub-StockPile beginning and endpoints can represent a resource allocation transfer 11 or resource beneficiation step 15 in the allocation of a resource. The sizing or washing of coal with its associated recoveries and changes to percent ash, sulfur, or Btu/lb can be accommodated as easily as a more sophisticated step in the beneficiation of an industrial resource such as in preparing Kaolin into a product ready form where multiple stages of beneficiation and blending have occurred to obtain a desired whiteness, brightness, particle size and viscosity.

It is also the preferred embodiment of the present invention to track each elementary quantity of the resource by the data associated with its identity. If two identifiable resources become blended into one, then a new entity is identified as the sum of the constituents. The identity of the constituents remains in the database as a reference to this new identity but the new entity has its own definition in terms of quantity, quality, size etc. Each entity's position is located in a chronological order in the database and as a Location/Level/ StockPile/Sub-Stockpile position designation. It is also the preferred embodiment to keep further physical account of the physical position of the resource element through a Global Positioning (hereinafter referred to as GPS) reference, local position reference, or other physical site reference. With such identification and positioning of each resource element at its particular endpoint of the allocation chain, any later transfer can have a high degree of accuracy in identifying what element or combination of elements is being transferred. Moreover, the identification of the quality of a group of such elements can be made for over a range of physical positions, chronology, or other desired groupings.

To enable such detailed accounting of each element in the allocation chain, it is the preferred embodiment of the present invention to use a combination of radio frequency indentification, radio frequency data storage and radio frequency data retrieval to enable the automatic accounting and tracking of the data associated with the transfer of resources in the allocation process. It is the preferred embodiment of the present invention to use back scattering radio frequency technology to enable the 'hands off' combining of the data associated with transferred resources onto a remote Tag 12 on board a carrier of resources such as a truck. The remote tag 12 may be, for example, an INTELETAG manufactured by Amtech Corporation of Santa Fe, N. Mex. Alternative embodiments could use data accepting beeper technology that can also be retrieve from a beeper such as Motorola's "Advisor" and "Print Pal". With customer owned antennas, these could be made ready to accept data from a loader to a truck carrying resources or for other similar carriers. Using satellite links for data transfers, mobile cellular phone technology, or other such technology would allow for such transfers but are currently cost prohibitive. Using local infrared to transmit bar coded data from a loader to receptors on a truck could also be used, but may be awkward and subject to errors in the harsh mining environments of temperature, dirt, and vibration.

Although these alternative embodiments would work in theory, it is the preferred embodiment of the present invention to use the tag 12 as the radio frequency peripheral to allow for the Radio Frequency 22 identification of a truck and the Radio Frequency 22 transfer and local storage and removal of the data associated with the resource being transferred for the duration of such transfer. The origin and destination locations, weight, quality ID's, owner of resource, customer order number for resource, beneficiation required of resource, and other such information can be automatically 'attached' to the resource via a local computer on board loader 21 that Radio transfers 22 this data to a Tag 12 acting as an effective electronic packing slip. In this manner the practical problem of manually keeping track of all base operations and transfers is automated and all operations can be easily accounted for. At other stages along the allocation route other workstations 11 can either radio frequency transfer 14 data onto the Tag 12 or similarly remove data from the Tag 12 to local databases on the workstation.

Physical position references of the location of the resources can also be determined by Global Positioning GPS referencing means 13. Although this means can be attached to each carrier, it is the preferred embodiment of the present invention that the GPS 13 be attached to a loader which can then determine the GPS source and/or destination positions of a carrier and transfer such information to Tag 12 via radio frequency connections 22. In this way the expense of the requirement of a GPS 13 and onboard computer 21 is required on a loader and not on all carriers. A Tag 12 is required on a carrier only.

With a sufficiently generic and elementary means of accounting for each stage of resource transfer, with a means of automating the otherwise manually time prohibitive task of accounting for such transfers embodied in the described radio frequency preferred means, and with a client-server database environment where the client (e.g. front-end loader) can act independently of other client workstations or server, but where on such server all elementary allocation transfers can be integrated, coordinated, analyzed, sorted, and indexed, wide ranging uses for such accurately integrated data can be used for many allocation requirements, such as optimizing 19 all the allocation paths for all subsequent allocations orders 20.

Thus it is with these means that a broad and generic method is established to better enable the wide scale allocation of resources within a company to better enable more accurate information tracking of its resources, but in a form that can be used for many different purposes not the least of which is to promote the improved realization of resources by providing for a transfer method and means that can automatically acquire radio frequency transferred data of a resource's identity, quantity, quality, costs, beneficiation response, and other such data that can be provided as input for the optimization means described in U.S. Pat. No. 5,033,004.

FIG. 1 shows the primary functions of the allocation process. These consist of resources transaction tracking 11, resource beneficiation (partition) tracking 15, laboratory transaction tracking 18, customer scheduling and tracking of customer's orders, and specifications 20, the optimal allocation of resources 19 via the technology described in U.S. Pat. No. 5,033,004, and the radio frequency transfer 22 of resource data to an electronic tag 12 which can be later retrieved from a workstation 11 via similar radio frequency transfer 14. All these functions are available through computer workstations and their connections to a common computer server.

Figure 2A:
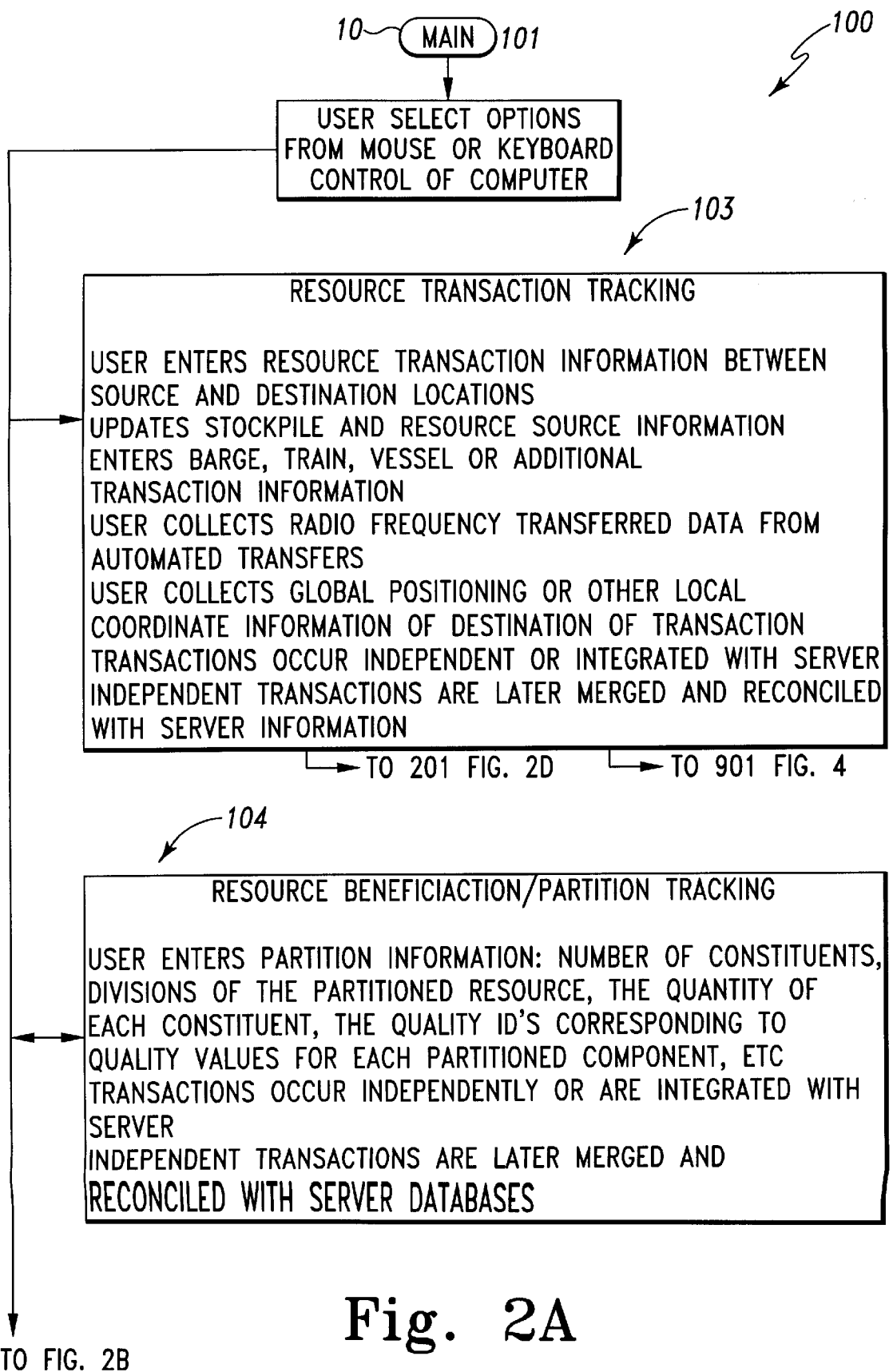
FIGS. 2A–N, P, Q are a schematic process flow diagram of a preferred embodiment resource allocation system of the present invention.

FIG. 2A describes how the user can select any of these functions from a keyboard or mouse control 102 of a workstation. FIG. 2A describes the resource transaction tracking function 103, the resource benefication/partition tracking function 104, the laboratory transaction tracking function 105, the customer specification, scheduling and order tracking function 106, and the optimal allocation of resources function 107. The resource transaction tracking function 103 generally allows user to enter resource transaction information between source and destination locations; updates stockpile and resource information; and enters barge, train, vessel, or additional transaction information. These transaction entries are achieved through elementary allocation operations described in FIGS. 2D–E. User also collects radio frequency transferred data from a computer workstation through radio frequency transfers from electronic tags 12 located on carriers. User also collects global positioning or other local coordinate information of the destination of such transfers from such electronic tags 12. User can enter transactions at a local workstation independently of server but transactions are later merged and reconciled with server information.

Figure 2D:
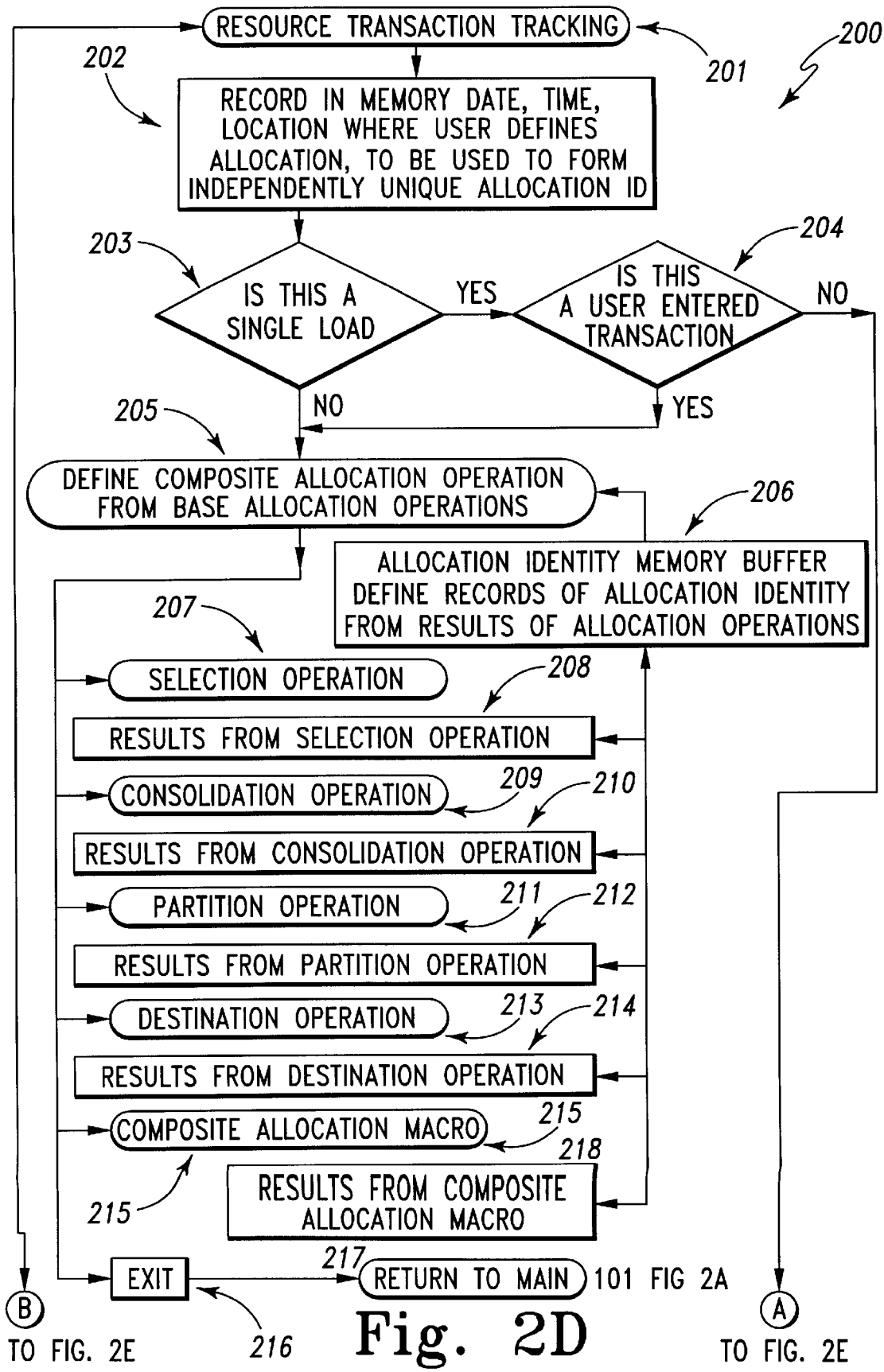
Figure 2E:
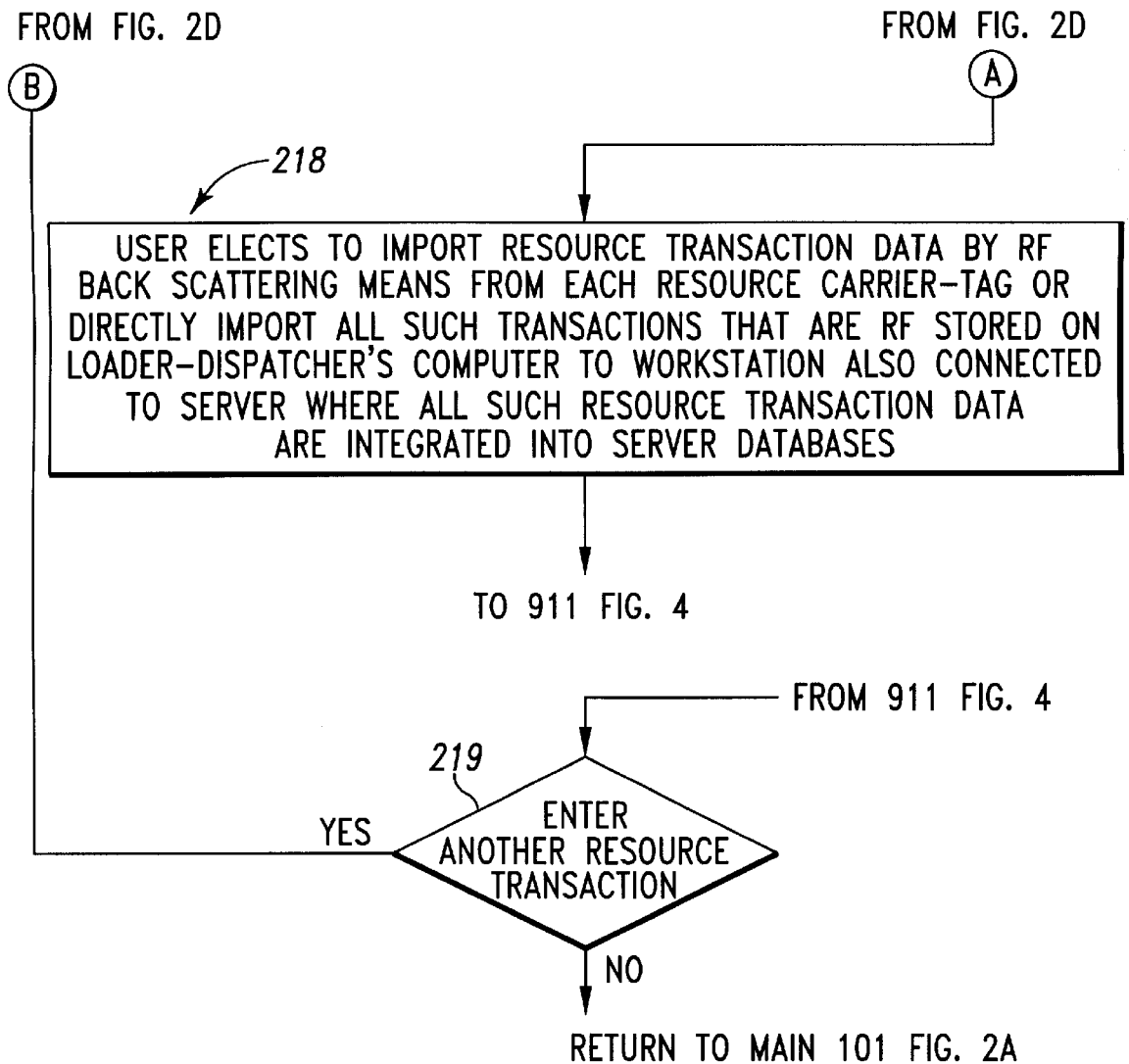

FIGS. 2D–E describes the basic elements of the resource transaction tracking process 201. It is the preferred embodiment of the present invention to implement a resource transaction between an origin and destination point for a particular stage in the allocation through basic allocation operations. FIG. 2D illustrates the selection operation 207, consolidation operation 209, partition operation 211, and destination operation 213.

Referring to FIG. 1 and FIGS. 2D–E, user first inputs into workstation 11 the current date, time, and the location from where the user is defining a particular allocation 202. This information provides the elements to determine a unique allocation identification (ID) so that user can proceed independently of server 16. At a later time, when the resource record containing such ID is integrated into the server databases, the above ID structure assures uniqueness. User is prompted 203 by workstation 11 to issue resource transaction as a single or multiple transfer. User is prompted 204 to enter the transaction or to retrieve transaction information from electronic tag 12 connected to resource carrier through radio frequency means. If user enters transaction, user can define any allocation transfer from a composite of base allocation operations 205. Such allocation operations assemble resource records identified by user into an allocation identity buffer 206 located in RAM or magnetic disc memory in workstation 11.

Figure 2F:
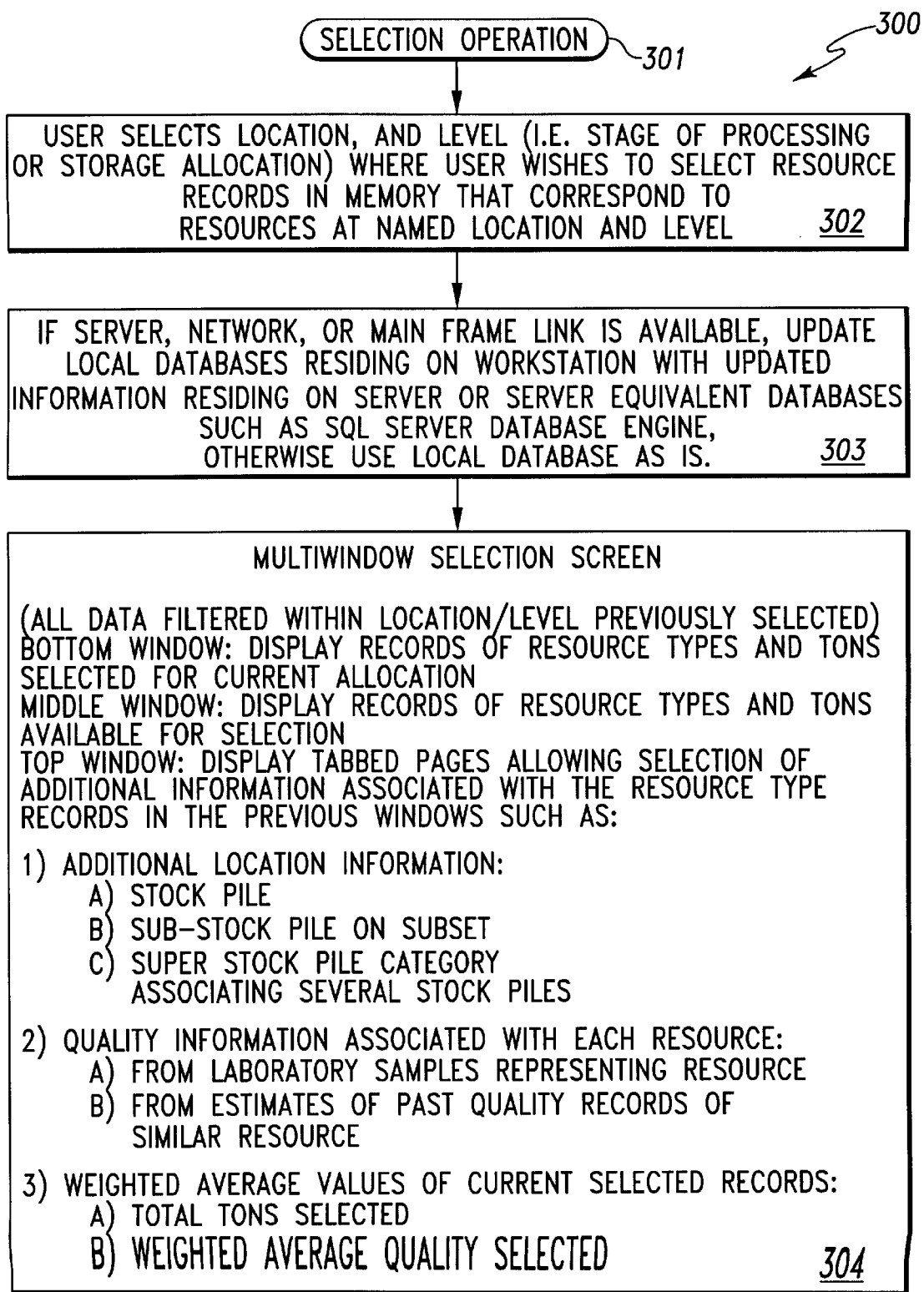
Figure 2G:
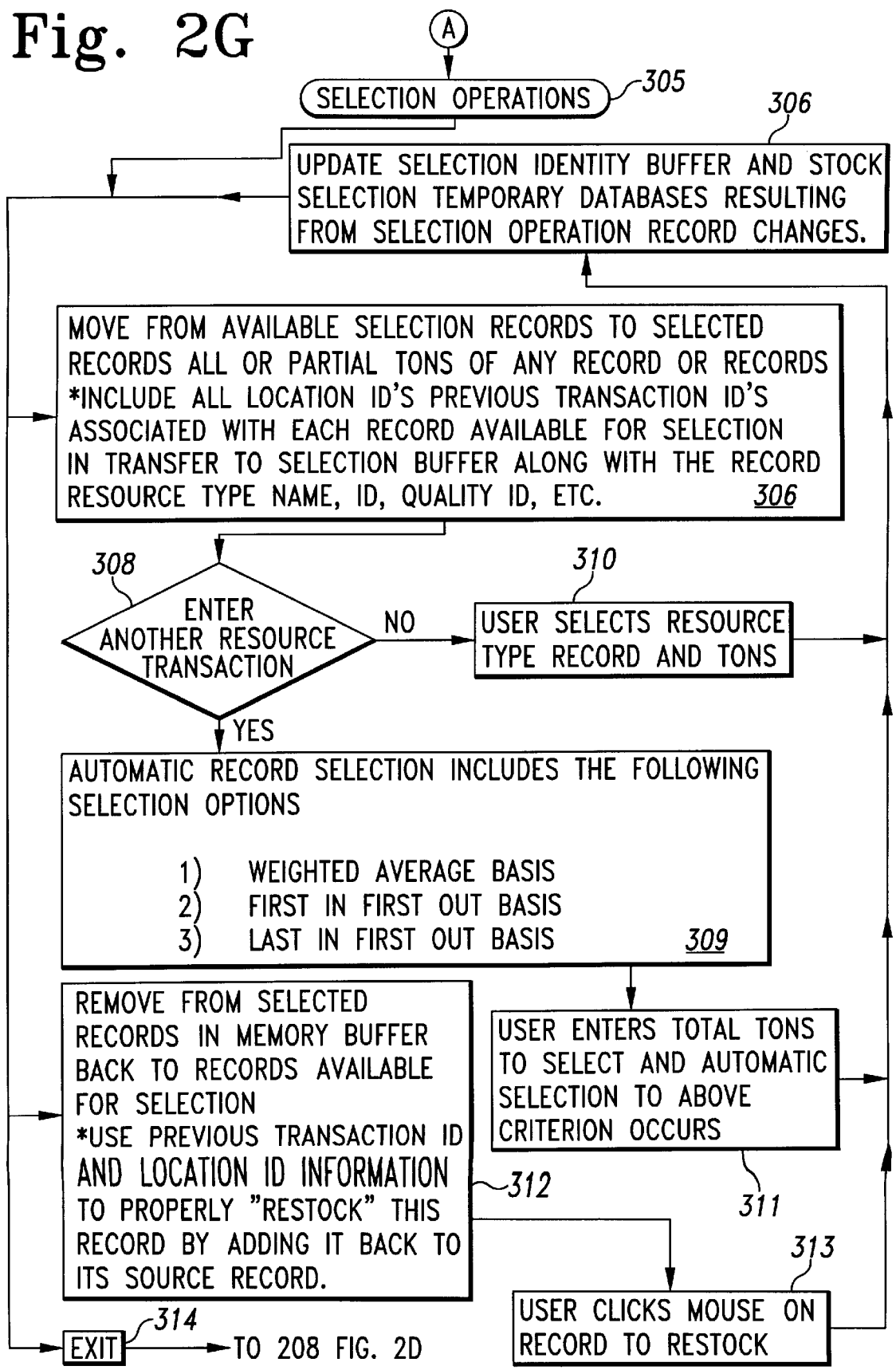

Selection operation 207 is illustrated in greater detail in FIGS. 2F–G. In FIGS. 2F–G selection operation 301 begins with user inputting into workstation 11 the location and level 302 (i.e. stage of processing or stage of storage at such location) corresponding to a physical location where allocation transfer begins. If server database links 17 are available server automatically updates local databases residing on workstation with updated resource information 303 residing on server. Workstation databases then include the latest information about the resources at the location designated by user.

Multi-window selection screen 304 displays three main windows for implementing the allocation selection. The bottom window displays resource records selected by user from the available resource records displayed in the middle window. The top window provides tabbed pages allowing selection of additional information associated with resource records located in either window. Such additional information may include quality, quantity, weighted average qualities, stockpile coordinates, and other such information.

Selection operations 305 used to update or to select from available resources 307 by allowing user to choose 308 to select separate resource records 310 or to automatically select records 309. If automatic record selection 309 is selected user can choose selection on a FIFO, LIFO, or weighted average basis. Automatic selection of the first, last, or weighted average combination of resource records are then transferred to the selection identity buffer 306 in RAM memory to meet the quantity criterion 311 specified by user's entry. All location information and transfer origin information is transferred to the selection identify buffer 306 along with resources records. This provides a trail of each resource record's origin. This information is also used to remove the selected records 312 from selection buffer and restore them in their original records if desired. User uses mouse and keyboard entry to implement all such selection operations 313. User can choose to move records 307, remove records 312, or return 314 FIG. 2G return with the results from the selection operation 208 FIG. 2D in the allocation memory buffer 206.

Consolidation operation 209 is illustrated in greater detail in FIGS. 2H–J. In FIGS. 2H–J consolidation operation 401 begins with a multi-window display 402. The middle window displays records currently selected residing in the allocation identity buffer 206 FIG. 2D. The bottom window displays resource records selected from the allocation buffer for consolidation. The top window displays tabbed pages allowing the view and selection of additional information associated with the resource records in the previous windows. Specific information is provided such as the weighted quality averages and total tons of the records selected for consolidation.

As illustrated in FIG. 2H, consolidation operations 403 allow the user to select from records stored in the selection identity buffer 206 FIG. 2D and move these records 405 to the consolidation identity buffer 404. User selections are initiated by keyboard entry or by means of clicking mouse on desired records. Computer workstation automatically transfers such records. These records form the constituents of the consolidation. All information associated with the transfer of records selected for consolidation is stored in the consolidation identity buffer 404 which enables these records to also be removed 406 and returned to the selection identity buffer 206 FIG. 2D.

When all constituent records designated for consolidation have been selected, user may select the option to save the consolidation 407 by clicking a mouse on this option. Workstation automatically generates a consolidation ID 408 which is unique to the location of the workstation used to initiate such consolidation. Uniqueness is assured by using a combination of such location, date, time, the number of consolidations issued for current date and an offset number to resolve any later conflicts that may arise when the consolidation record is integrated with all such records on the server.

Several database buffers are updated 410 upon saving the consolidation 407. The previous resource records in the selection identity buffer that were designated for consolidation are transferred to the consolidation constitution buffer and replaced with the new consolidated resource record that also remains in a database table of consolidated records. Weighted average qualities, yields, and costs are determined from each partition of the constituent records. The weighted average of these values are stored in a new partition corresponding to the newly formed consolidation record. All such consolidation and constitution buffers are temporary and are cleared if the user selects to exit the consolidation operation 409 without saving such consolidation. Upon saving such consolidation, the consolidated record with the other selected records are returned 210 to the allocation identity buffer 206 FIG. 2D.

Figure 2K:
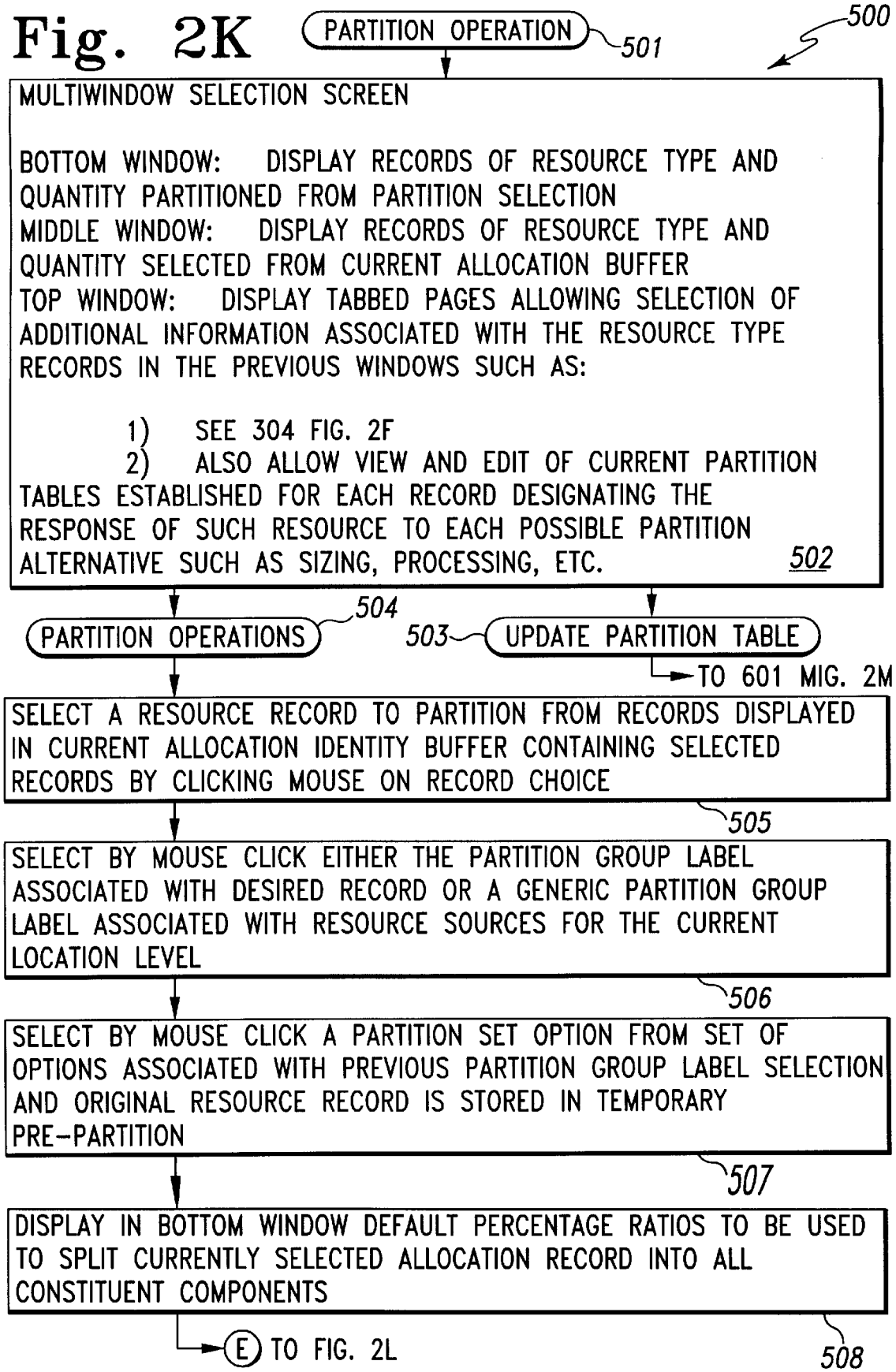

The partition operation 211 FIG. 2D is illustrated in greater detail in FIGS. 2K–L. The partition operation 211 serves a dual function in that it can be used for the purpose of tracking division of a resource in the resource transaction tracking function 11 FIG. 1, and it can be used for the purpose of resource beneficiation tracking 15 FIG. 1. In FIG. 2K the partition operation 501 begins with a multi-window display 502. The middle window displays records currently selected residing in the allocation identity buffer 206 FIG. 2D. The bottom window displays resource records selected and partitioned into separate records from the allocation identity buffer. The top window displays tabbed pages which allows the viewing and selection of additional information associated with the resource records in the previous windows. In particular the current partition tables can be viewed and edited for each record. The partition table designates the response of each resource record to any possible partition alternative such as sizing or processing. A partition table for a selected record can be updated 503 with partition changes or the partition table can be selected from the partition operations 504 to determine how a specific resource record is to be partitioned.

Figure 2M:
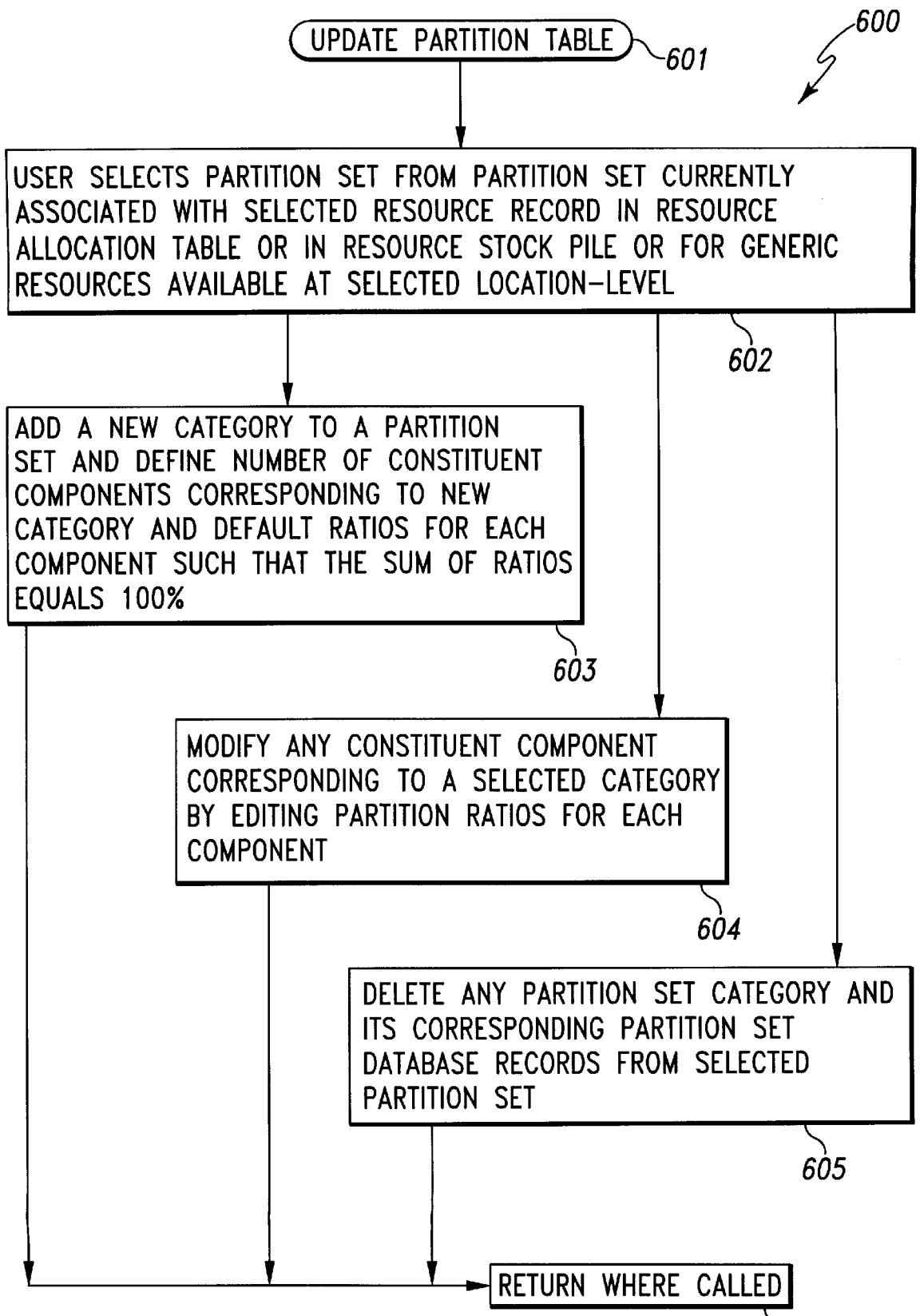

FIG. 2M illustrates how a partition table is updated 601. A user selects a partition set 602 from a partition set currently associated with a selected resource record in the resource allocation table, the resource stockpile table, or for generic resources available at selected location-levels. User can add a new partition set 603 and define the number of constituent components corresponding to this new category. Default partition ratios for each component are entered such that the sum of the ratios each 100 percent. A user can modify 604 any constituent component of a partition set by editing partition ratios for each component. A user can also delete 605 any partition set category and its corresponding partition set database records from selected partition set. A user is returned to the tabbed page where user requested 606 to update the partition table.

To make use of the partition table for an allocated resource record, partition operations 504 FIG. 2K are used. A user selects a resource record 505 to partition from records displayed in the current allocation identity buffer containing the selected resource records by clicking mouse on record choice. Then user selects 506 either the partition group label associated with selected record or selects a generic partition group label associated with generic resources for the current location-level. User continues by selecting 507 a partition set option from the set of options associated with the previous partition group label selection or original resource selection. The current selected resource record is stored in a temporary pre-partition buffer.

The number of partition records to be generated are displayed in the bottom window along with the percentage ratios to be used to split the currently selected allocation record into its constituent components 508. The user can edit these percentage ratios to correspond to actual values or use the default values previously displayed 509. The user can also enter actual quantities of each constituent component of resource that occurred in the partitioning of the bulk resource to which the resource record corresponds. The resulting partition records are stored in a temporary partition constitution buffer.

Quality IDs corresponding to quality values for each partition component refer to pre-defined default qualities for each record's partition. User can select these 510 FIG. 2L, select linear least squares estimates between the pre-partitioned record and the partitioned quality values, or the user can choose to override such estimates by entering quality estimate values. Quality IDs associated with each resource record, partitioned or otherwise, allow for any laboratory generated quality values to be linked back to the source record from which the laboratory values were taken. That is each resource record has a quality ID. Any laboratory samples taken from the actual bulk resources represented by such resource records are tagged resources with the corresponding quality ID. The qualities resulting from the evaluation of these laboratory samples are stored in database tables which automatically link these laboratory qualities to the proper resource records through their common quality ID. Least square estimates are derived from previous relationships between past similarly partitioned resource records stored in the databases locally or on the server.

User can select to save partition 511 FIG. 2L. If user elects to save partition, a partition ID is newly formed 513 from the user location, current date, time, the number of partitions issued for current date and offset numbers to assure uniqueness when partitioned resource record is integrated with server records. The identity allocation buffer is updated 514 to include the newly partitioned records and the pre-partitioned source record is deleted. A new partition table of partition sets is generated for each partition record transferred into the allocation identity buffer. This allows future partitioning of newly entered records. If user elected 512 to exit partitioning operation without saving partitioned records, all temporary database buffers associated with such partitioning are released. After exiting from partition operation user is returned to select addition allocation operations 205 with partitioned results 212 FIG. 2D.

Figure 2N:
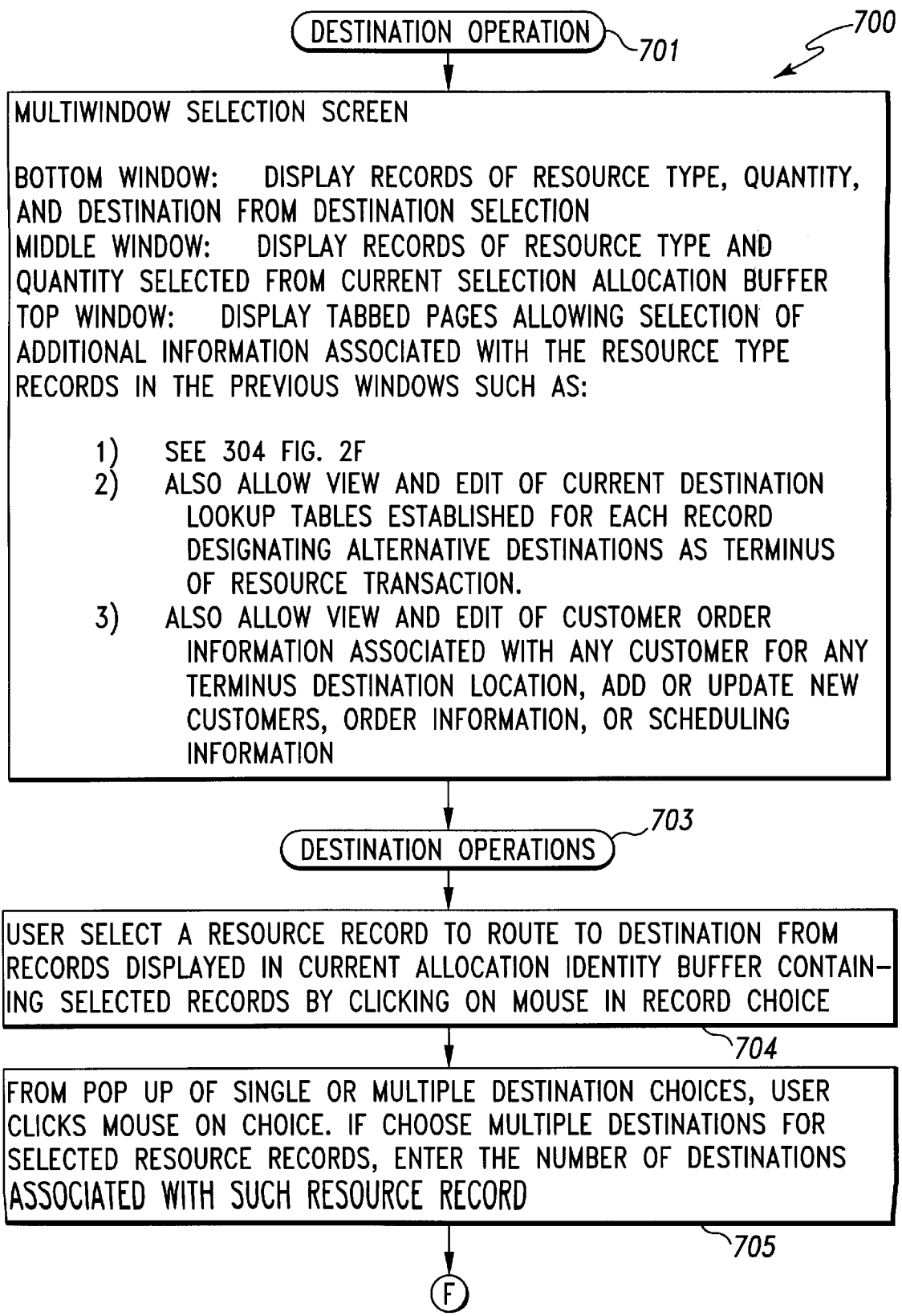
Figure 2Q:
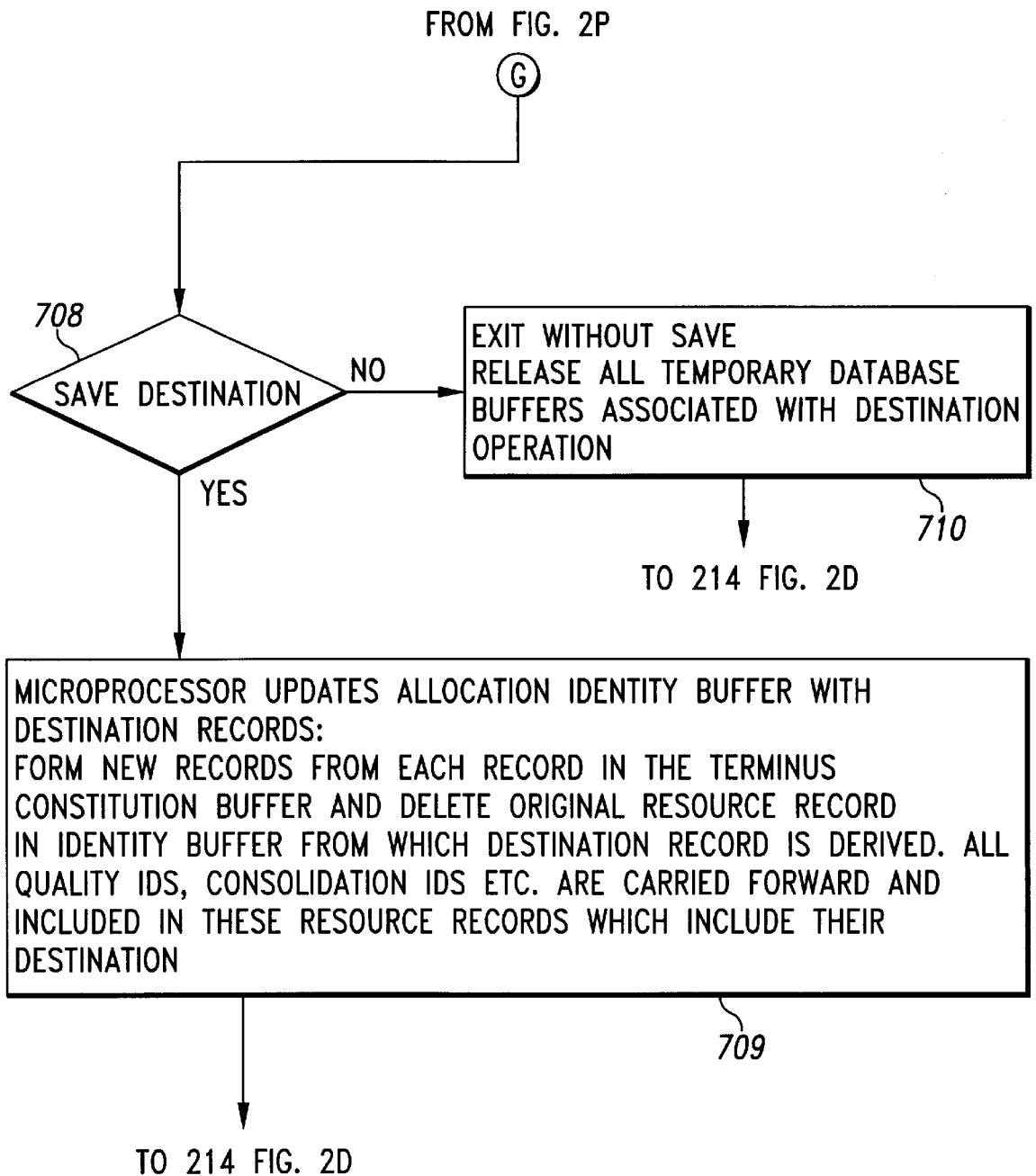

The destination operation 213 FIG. 2D is illustrated in greater detail in FIGS. 2N–Q. The destination operation 213 is used for the purpose of issuing the destination of a resource and thus ending the resource transaction. In FIG. 2N the destination operation 701 begins with a multi-window display 702. The middle window displays records currently selected residing in the allocation identity buffer 206 FIG. 2D. The bottom window displays resource records, their quantity, and their destination location for records selected from the allocation identity buffer 206 FIG. 2D. The top window displays tabbed pages which allows the viewing and selection of additional information associated with the resource records in the previous windows. In particular the user can view and edit the current destination look-up tables established for each resource record and for destination locations allowed from current location-level. User can also view and edit customer order information associated with any customer for any destination location. User can add or update new customers, order information, or scheduling information.

In FIG. 2N the destination operation 703 allows user to select 704 a resource record to route to destination from records displayed in current allocation identity buffer by clicking mouse on record of choice. From pop-up of single or multiple destination choices 705 user can select their choice. If user chooses multiple destinations for selected resource record, user enters the number of destinations associated with such resource record. Such record is transferred 706 to a temporary destination buffer displayed in the bottom window. If multiple destinations are required then the resource record is duplicated as many times as required. The resource record is deleted from the temporary identity allocation buffer and user is prompted to edit the quantity transferred to each destination which user is also prompted to designate. For each record transferred, a unique ID is formed for each record for the user location, current date/ time, the number of destination records issued from user location on current date, and an offset number to assure uniqueness. The original resource record and all destination records are saved in temporary destination buffers.

User selects 707 FIG. 2P from list of scheduled customer order/destination location combinations. If destination is a barge, rail vessel, or truck load-out, user is prompted for additional information such as barge drafting information for determining tons received at barge destination. Both quantity and quality IDs of shipped and received resource are input by user. Both shipped and received quantities and other values are stored in the temporary destination buffers.

User may elect to save 708 destination choices. If user elects to save such choices the allocation identity buffer is updated 709 with destination information for each resource record. If multiple destinations were chosen these new records together with destination information are transferred to the allocation identity buffer from temporary destination buffers. All quality IDs, partition IDs, consolidation IDs, and destination IDs are carried forward and are included in the resource records which now include their destination. If user elects to exit 710 without saving destination selections, all temporary destination buffers are released. Upon exiting, the results of the destination operation 214 FIG. 2D are carried forward in the newly updated allocation identity buffer 206.

After all base allocation operations 205 FIG. 2D have been issued by user, a complete composite allocation is achieved. Such composite allocation can be stored in the form of a Macro 215 so that similar composite allocations can be automatically generated and allow user to enter only the necessary data to complete the composite allocation. Such defined Macros can be named and later selected by user from a list of such composite allocation Macros. When a composite allocation is complete, user may exit 216 where the allocation identity buffer is stored permanently in a local database of composite allocations stored on the workstation 11 FIG. 1 or on a similar database stored on the server 16 FIG. 1.

FIG. 1 illustrates the radio frequency (RF) transmission 22 of resource information from a loader 21. This may include coordinates of source of such resource either in the form of GPS coordinates 13 or other local coordinate definition. Transmission of this RF encoded data to a receiver 'tag' connected to resource carrier allows the carrier to retain the information of the resource it is carrying.

Figure 3A:
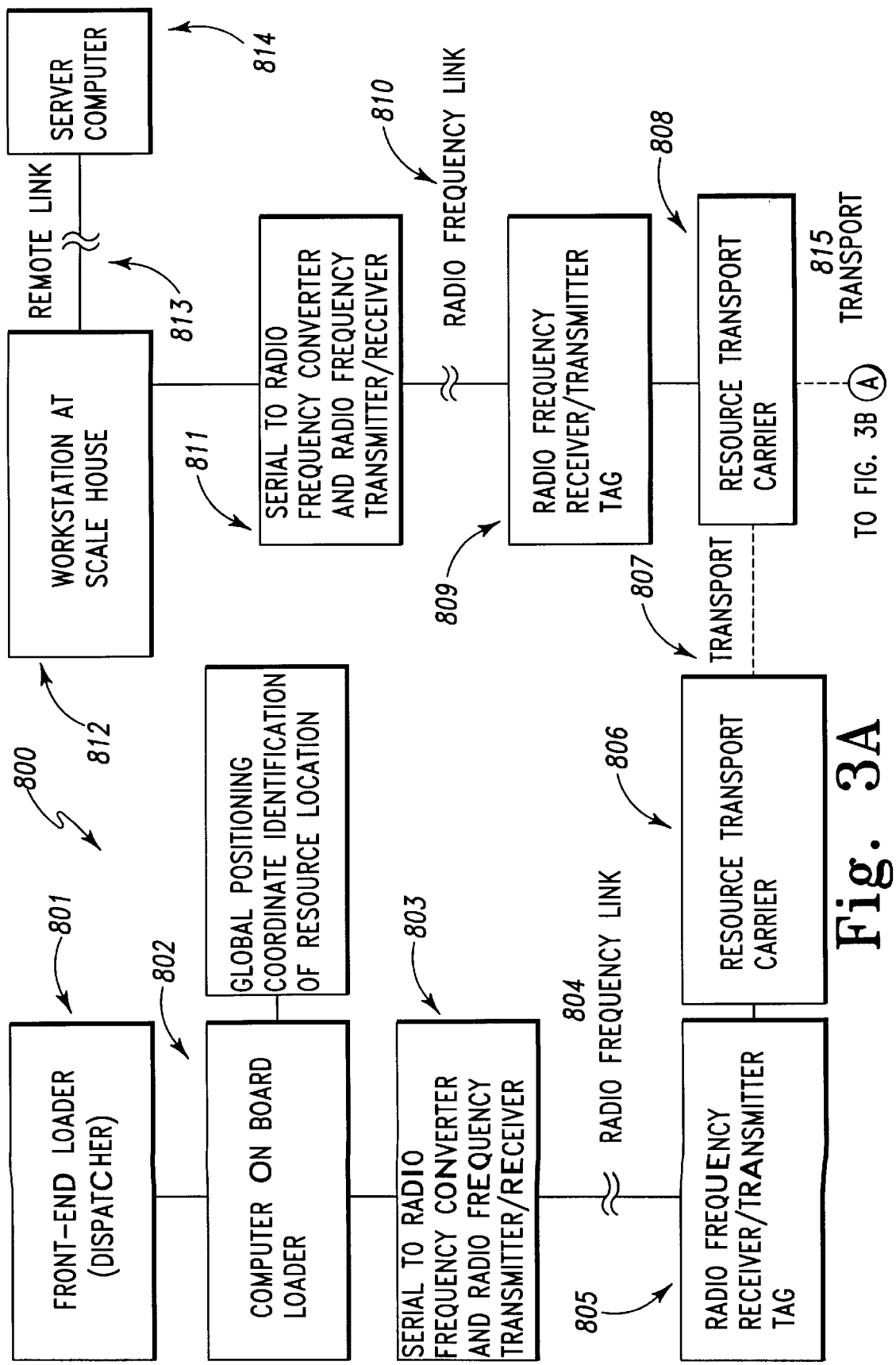
FIGS. 3A–B is a schematic block diagram of an exemplary resource allocation scenario using the system and process of the present invention.
Figure 3B:
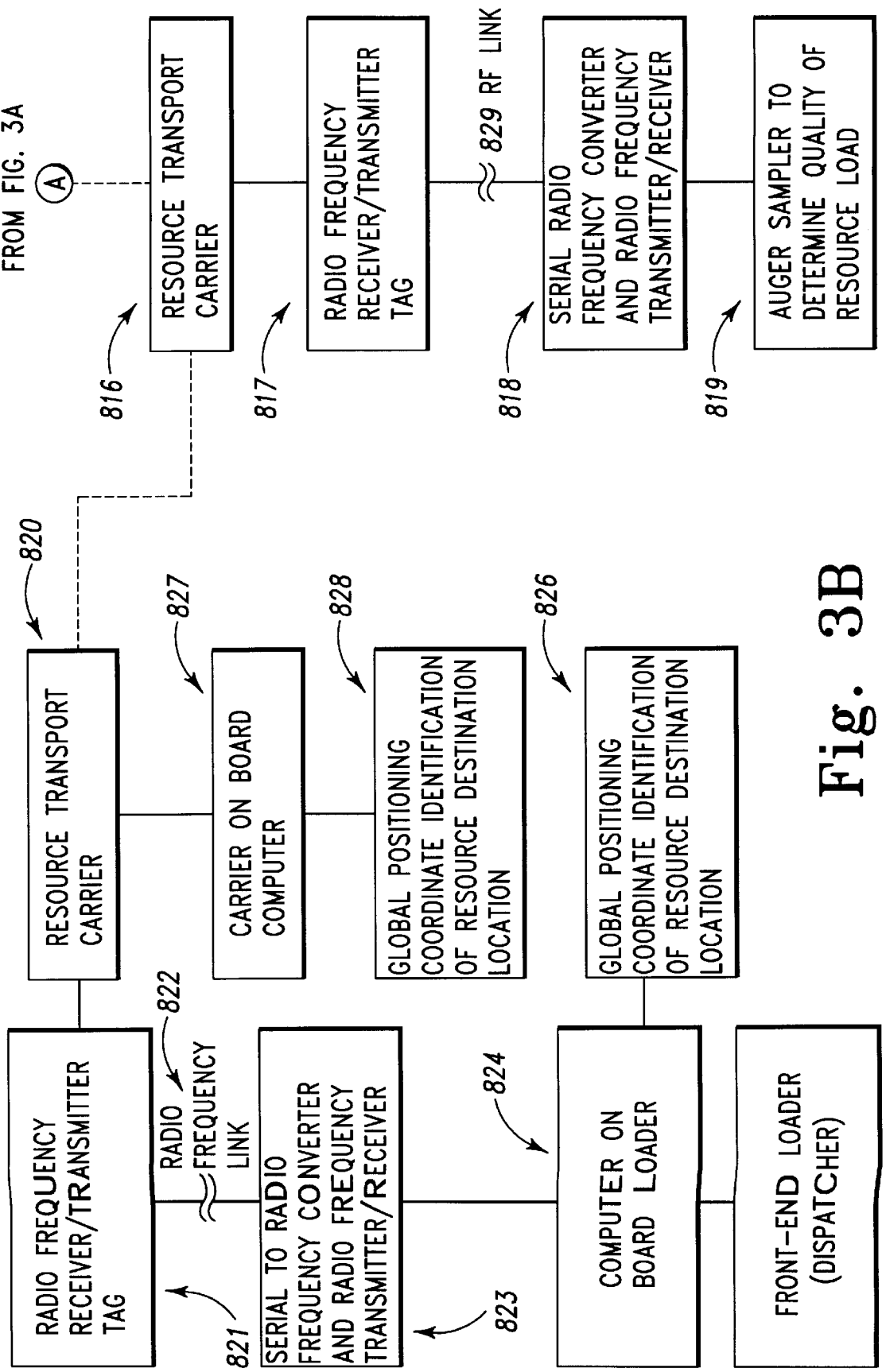

FIGS. 3A–B illustrates 800 a particular allocation scenario. In this illustration 800 a front-end loader 801 transmits resource origin information by RF link to a resource carrier-tag such as a truck with attached tag. Later, the carrier is weighed at a scale house 812 and this weight information is transmitted by RF means to the same resource carrier-tag 808. At another stage, an auger sampler 819 samples the resource contents of the carrier and the quality ID of this sample is again transmitted by RF means to the same resource carrier tag 820. At the final destination of this resource transfer, a loader operator 825 directs the deposit of the carrier's contents to a pre-chosen location. The coordinates of the destination location are determined by a global positioning means 826 attached to the onboard computer 824 of this loader 825. At this stage, the loader transmits RF information from the passive RF tag onboard the carrier containing all previously encoded allocation information for this transaction.

It is the preferred embodiment of the present invention to use as the AMTECH Inteletag RF transmission/passive tag technology 803, 811, 817, 823 as a means to encode serial data into an RF form, actively transfer RF data 804, 810, 829, 822, to a passive tag 805, 809, 818, 821 located on carrier. At any RF transmission point, data can be either transmitted to the passive RF tag or received from the passive RF tag depending on the preferred arrangement of a particular user. Hence, resource origin data encoded on carrier tag 809 arriving at scale house 812 could just as easily be removed by a RF back scatter transmission/reception 811 from the passive tag 809 attached to carrier 808.

Figure 4B:
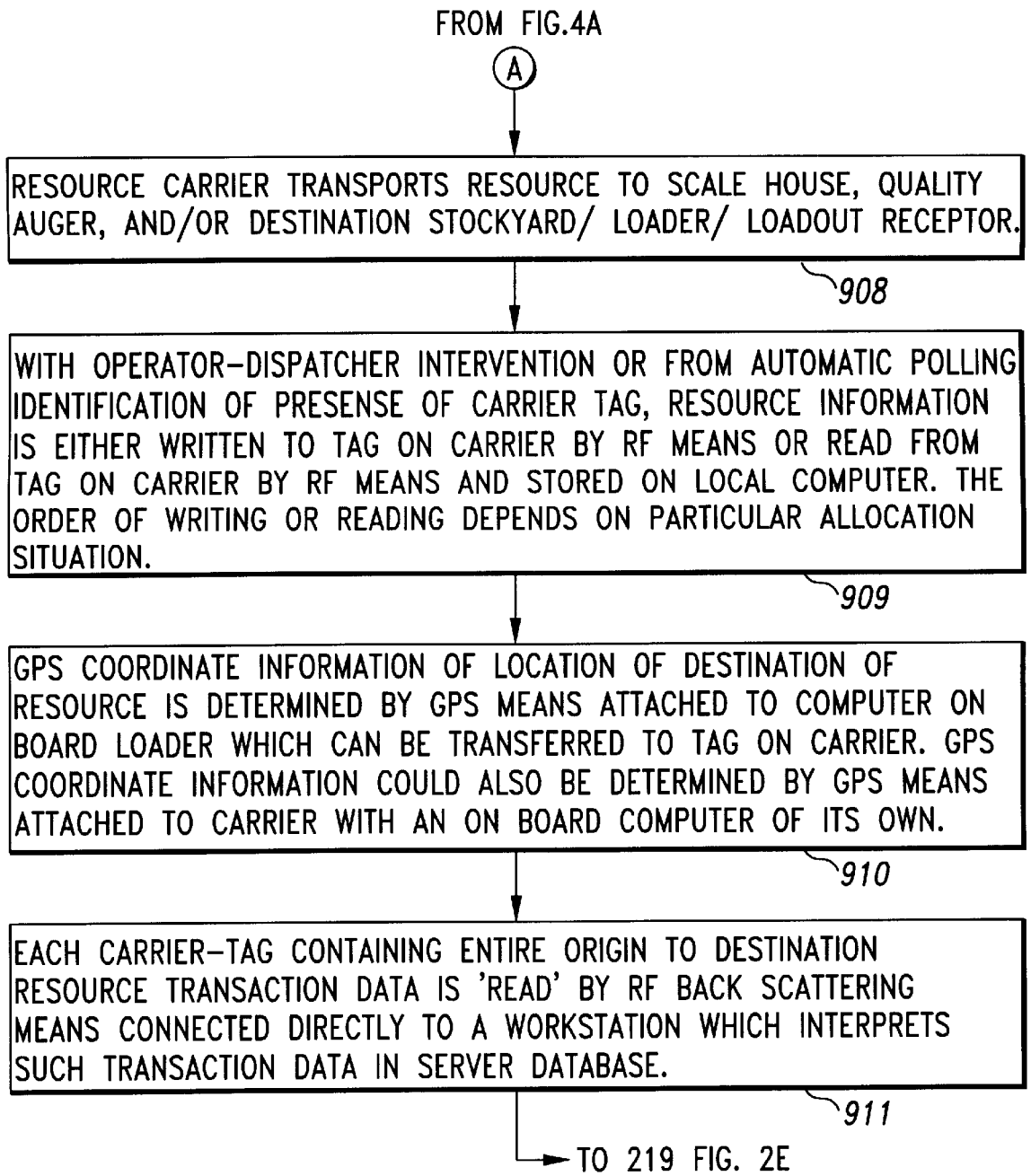

FIG. 4 is a schematic block diagram of a radio frequency enable transaction tracking process of the present invention. 900 through 911 outline the steps of this process. The unique identification of a tag attached to a particular carrier is critical in that data 'written' to a tag or 'read' from a tag by RF means assumes that a particular tag is identified. This ability to uniquely identify a tag assures the continuity of resource information associated with a particular transaction. A polling means in the AMTECH transmission/reception identifies all tags within a proximity of about 100 feet. All such polling is automatic and does not require any operator but is controlled by the computer attached to the transmission/reception apparatus. Hence, if there are multiple carriers containing multiple tags within this proximity, all such tags will be identified. A separate means is needed to discriminate between such uniquely identified tags. A loader operator can view a list of all identified tags within the polling proximity. A loader operator can then choose which tag is to have data 'read from' or 'written to'. In an alternative embodiment of the present invention, a carrier operator could key in its tag ID to a keyboard input outside of carrier and attached to polling computer. By this means, the carrier operator would identify itself and data could be automatically 'read from' or 'written to' carrier's tag.

By these RF means, a carrier-tag can be uniquely identified and resource information can be written to such tag at each stage of the transfer of a resource transaction. At any of these stages or at an additional final stage, such resource information can be read and removed from such tag by a transmission/reception means attached to a workstation and then stored in a local or server database. If the final removal of such tag encoded resource data is performed by an independent computer onboard a loader, such computer can be periodically removed from such loader and its data directly linked and transferred to a workstation or server database.

Data used to determine costs associated with overburden moved by haulers of overburden, bulldozer pushes of overburden, scrapers of overburden, drillers of overburden, and other such equipment used in the mine production process van be generated by a automatic (or user-initiated) counting of the number of such production passes made by the particular equipment in the field or by timing the duration of such production activity. Timing or counting such passes is made by a digital counter connected on board such production equipment. A serial connection to a small onboard computer allows the storage of such counts made for each type of production pass made by a particular piece of such production equipment for a particular shift or day. Thus, for example, if a bulldozer supports the production removal of overburden for a particular loader for part of a shift, the count of the passes made by such bulldozer for each respective function can be made. The particular loader or loaders supported, the particular section of a mine pit cleared of topsoil are additional information that can be entered into a small PC computer on board such equipment. The tracking and categorizing of such data allows the mining engineer to determine its costs for different methods of mining, collections of such mining equipment, and the labor required to support such equipment. Such digital counts stored on a computer on board production equipment can be automatically read in quotes by RF back scatter means by production manager through RF tags serially connected to computer on each production equipment. With RF antenna on manager's truck, manager can pass each piece of equipment and automatically have such production data, maintenance remarks, maintenance data, and/or any other data associated with such production equipment "read" by radio frequency back scatter means into computer on production manager's truck. Production manager can later download production data collected for each piece of production equipment to server databases by connecting his computer with workstation or remotely to databases on server. Alternative embodiments for similar radio frequency means could include cellular technology, customer based beeper technology with data transfer capability, or other such radio frequency means. However, it is the preferred embodiment of the present invention to use such radio frequency back scatter means to achieve the radio frequency transfers.

What is claimed:

1. A method for tracking natural resources in a resource allocation system, comprising the steps of:
    a) creating a base allocation record for each of a plurality of bulk material items, wherein each of the base allocation records contains descriptive data relating to the associated bulk material item, the descriptive data including at least a quantity, quality factor, cost and location of the bulk material item;
    b) providing a desired natural resource specification specifying at least a desired quantity and a desired quality factor;
    c) selecting a plurality of base allocation records;
    d) consolidating the selected plurality of base allocation records into a consolidated allocation record meeting the desired natural resource specification;
    e) moving the bulk material items associated with the consolidated allocation record to a destination location; and
    f) recording the destination location in the consolidated allocation record.

2. The method of claim 1, wherein each of the plurality of bulk material items comprises a quantity of coal.

3. The method of claim 1, wherein consolidated allocation record contains consolidated descriptive data calculated as a weighted average of the descriptive data of the selected base allocation records.

* * * * *